Jan. 4, 1927.　　　　L. S. ROSENER　　　　1,613,132
MACHINE FOR PREPARING BOX BLANKS
Filed Nov. 11, 1924　　16 Sheets-Sheet 3

INVENTOR
LELAND S. ROSENER
BY White Prost + Evans
HIS ATTORNEYS

Jan. 4, 1927.  
L. S. ROSENER  
1,613,132  
MACHINE FOR PREPARING BOX BLANKS  
Filed Nov. 11, 1924   16 Sheets-Sheet 4

FIG. 4.

INVENTOR  
LELAND S. ROSENER  
BY White Prost + Evans  
HIS ATTORNEYS

Jan. 4, 1927.  
L. S. ROSENER  
1,613,132  
MACHINE FOR PREPARING BOX BLANKS  
Filed Nov. 11, 1924  16 Sheets-Sheet 6

INVENTOR  
LELAND S. ROSENER  
BY White Prost & Evans  
HIS ATTORNEYS

Jan. 4, 1927.

L. S. ROSENER 1,613,132

MACHINE FOR PREPARING BOX BLANKS

Filed Nov. 11, 1924     16 Sheets-Sheet 8

INVENTOR
LELAND S. ROSENER
BY White Prost + Evans
HIS ATTORNEYS

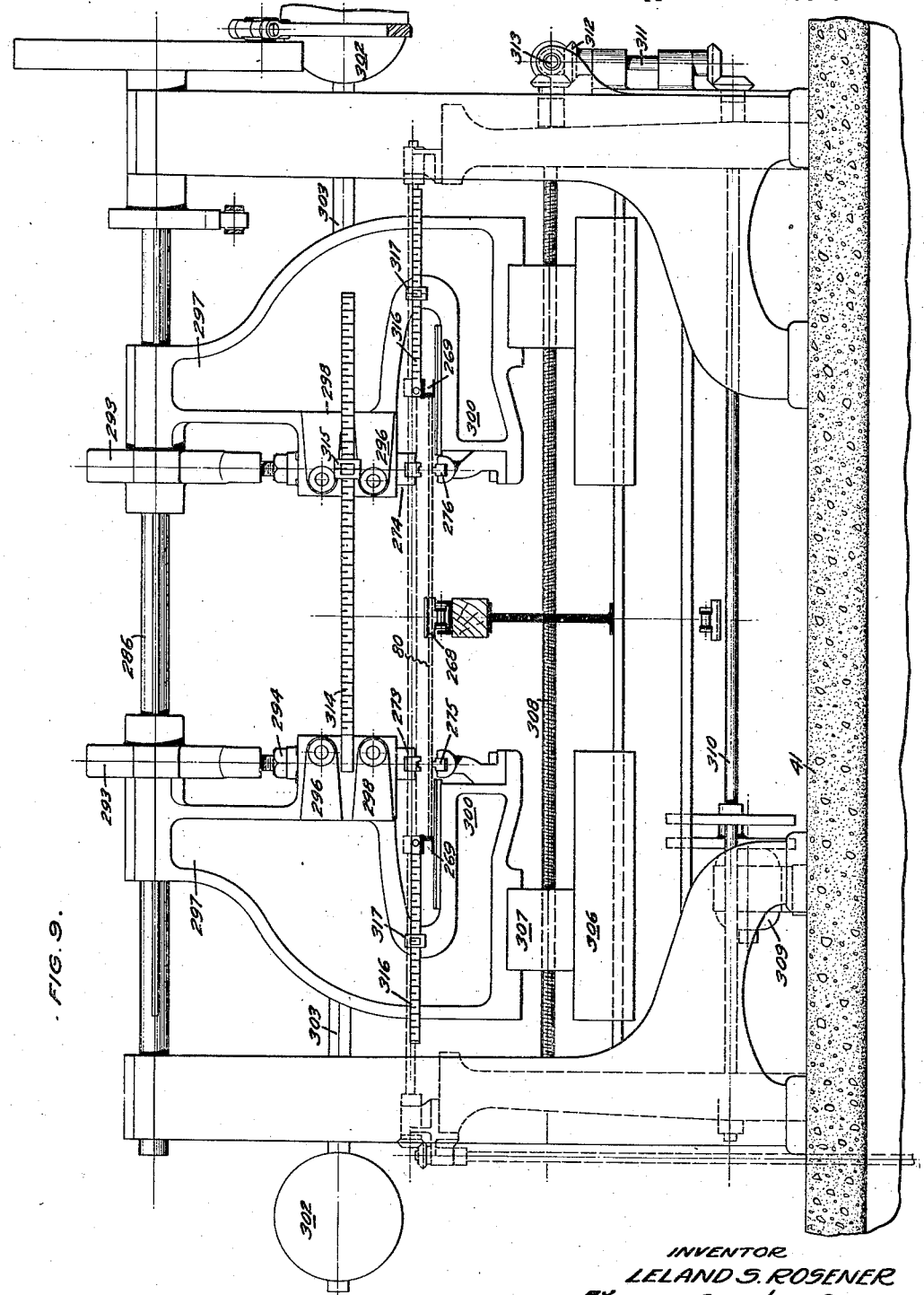

Jan. 4, 1927.                                                1,613,132
L. S. ROSENER
MACHINE FOR PREPARING BOX BLANKS
Filed Nov. 11, 1924    16 Sheets-Sheet 10
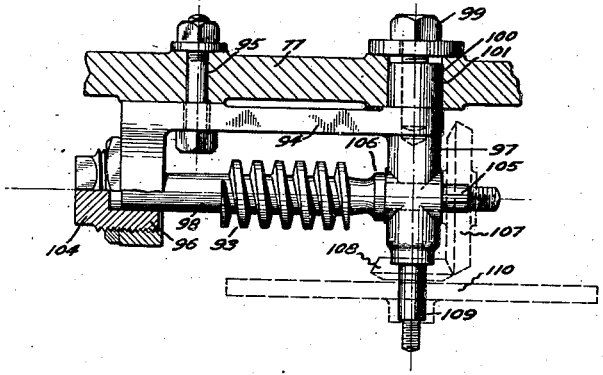
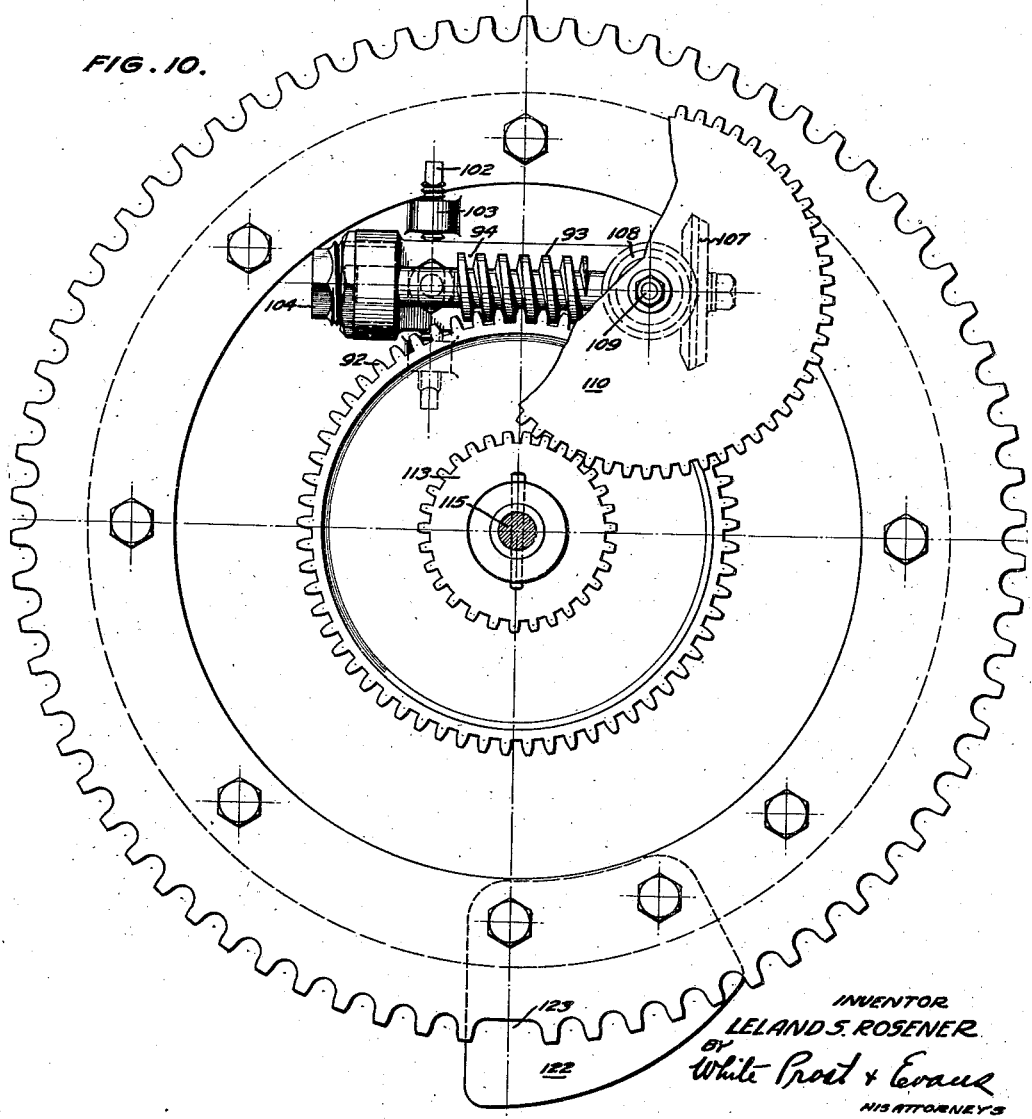

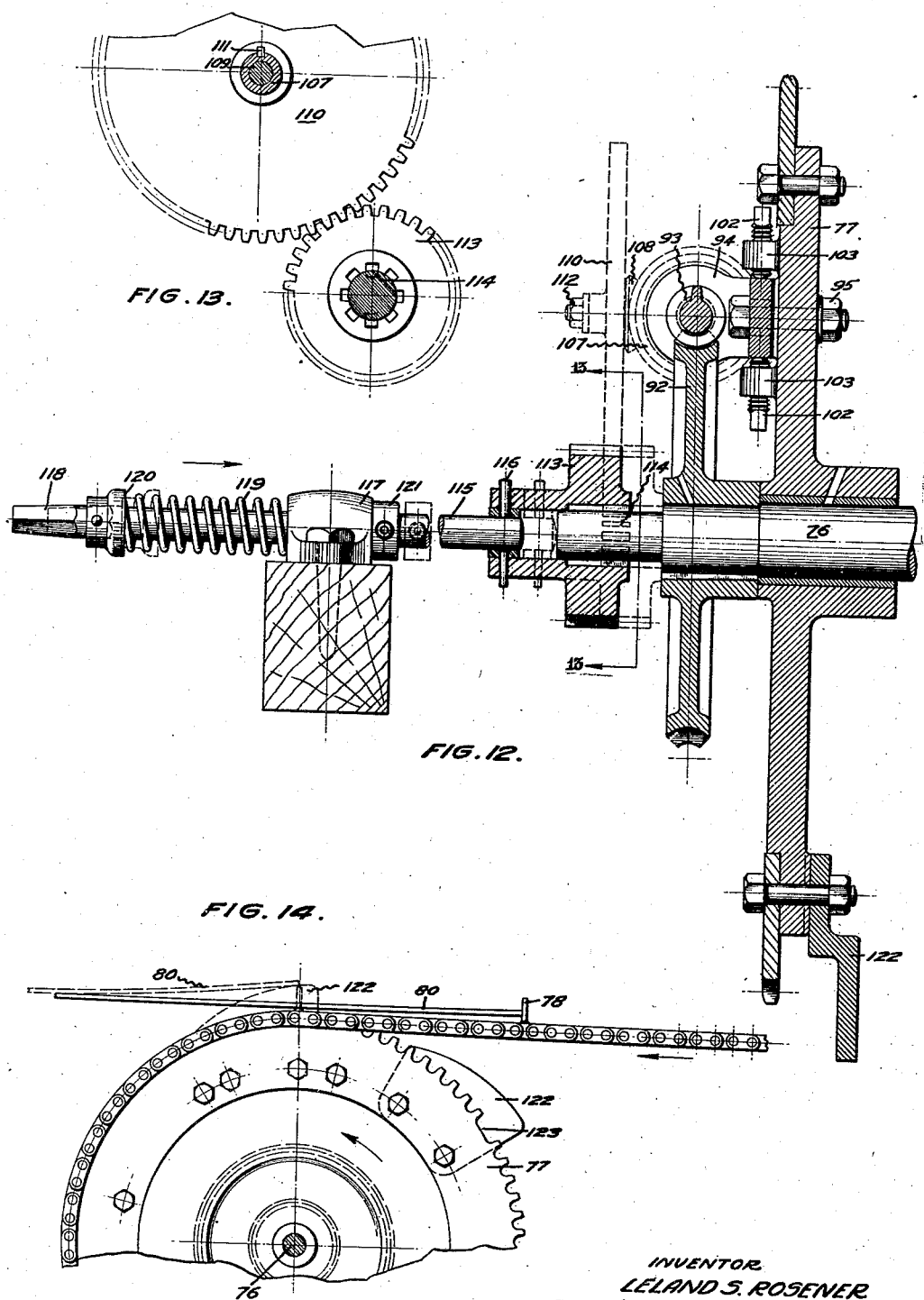

Jan. 4, 1927.
L. S. ROSENER
1,613,132
MACHINE FOR PREPARING BOX BLANKS
Filed Nov. 11, 1924    16 Sheets-Sheet 12
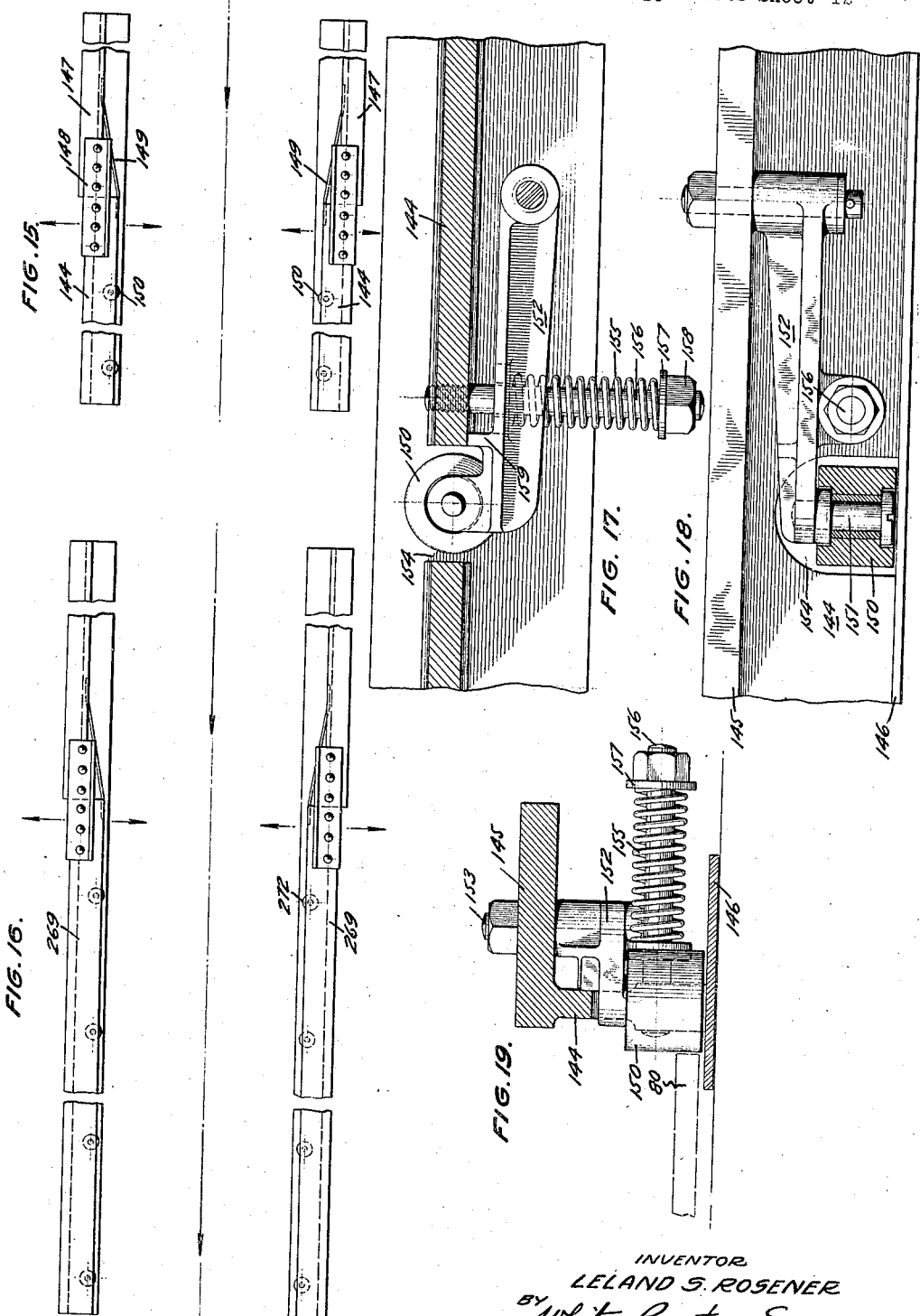
INVENTOR
LELAND S. ROSENER
BY White Prost + Evans
HIS ATTORNEYS

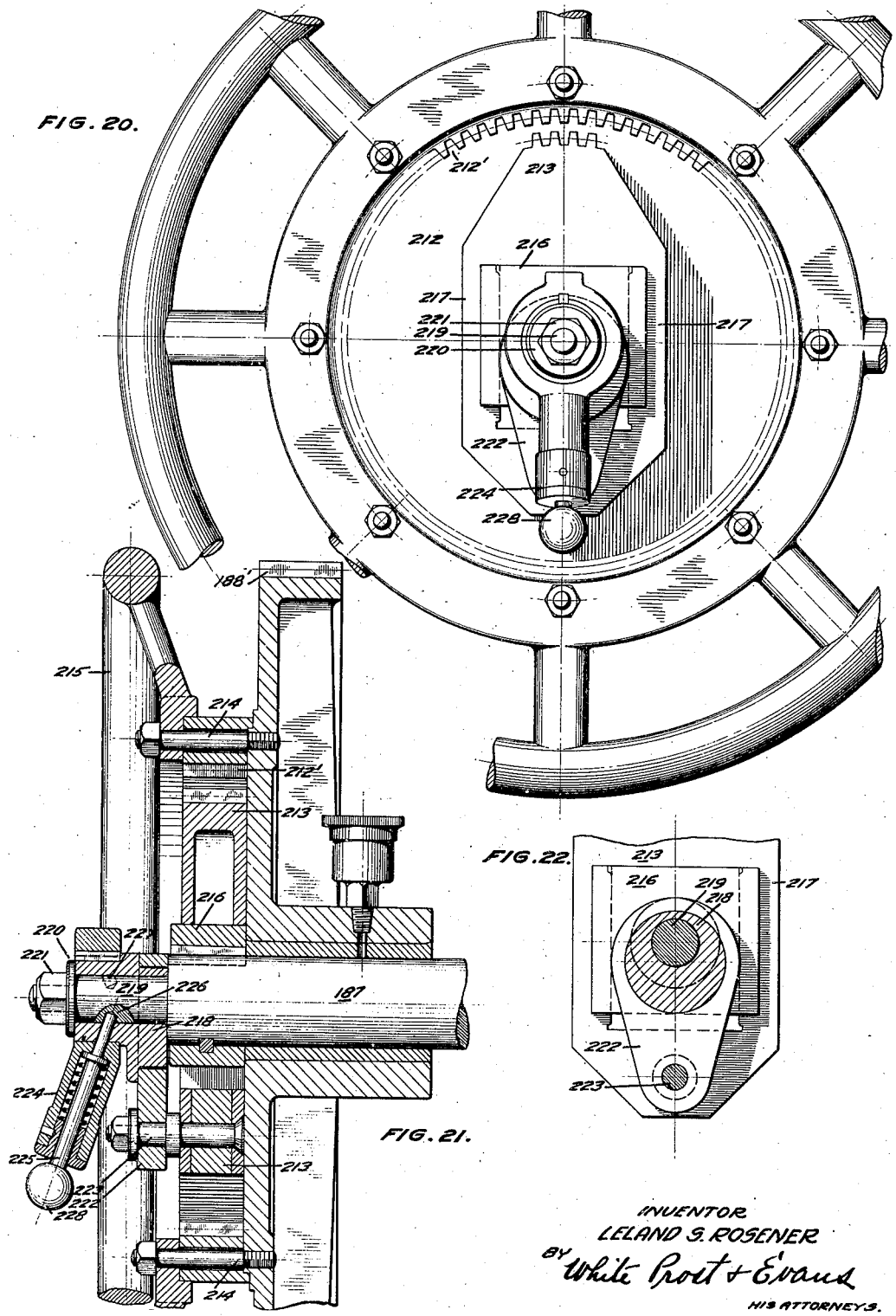

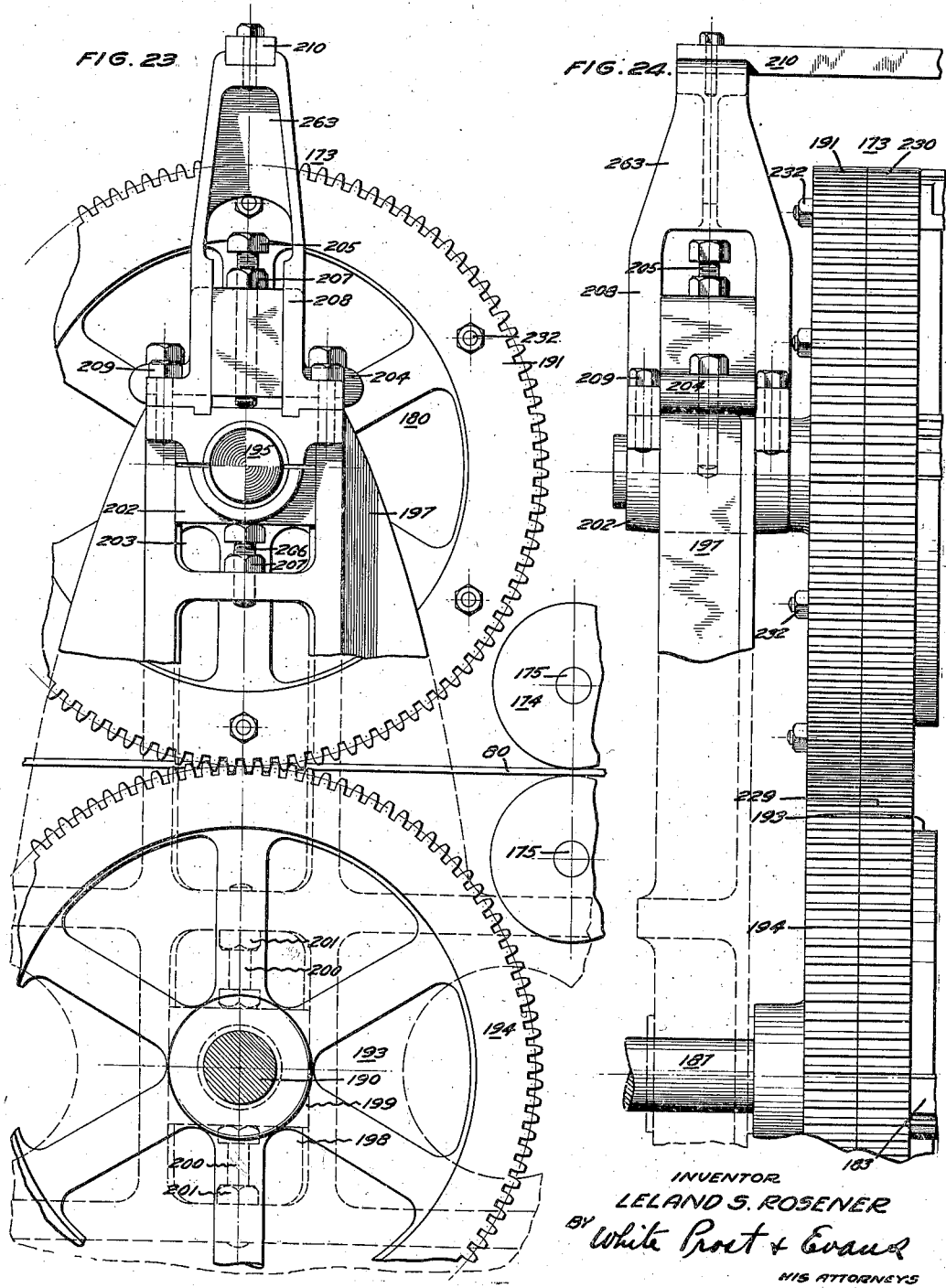

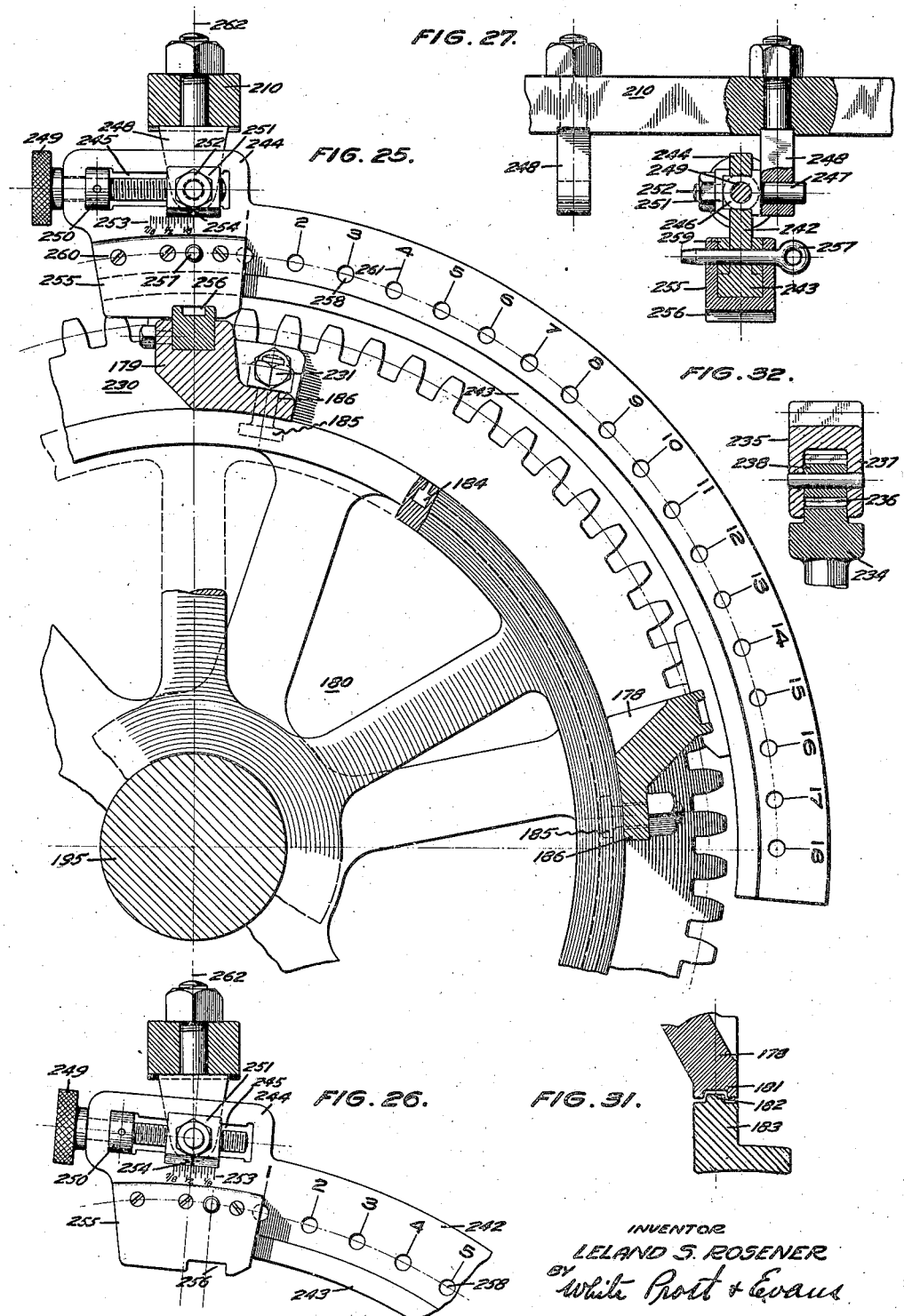

Jan. 4, 1927.
L. S. ROSENER
1,613,132
MACHINE FOR PREPARING BOX BLANKS
Filed Nov. 11, 1924     16 Sheets-Sheet 16

INVENTOR
LELAND S. ROSENER
BY White Prost + Evans
HIS ATTORNEY

Patented Jan. 4, 1927.

1,613,132

UNITED STATES PATENT OFFICE.

LELAND S. ROSENER, OF SAN FRANCISCO, CALIFORNIA, ASSIGNOR TO THE PARAFFINE COMPANIES, INC., OF SAN FRANCISCO, CALIFORNIA, A CORPORATION OF DELAWARE.

MACHINE FOR PREPARING BOX BLANKS.

Application filed November 11, 1924. Serial No. 749,157.

This invention relates to apparatus for operating on thin, fibrous material, such as paper board, whereby such material may be readily shaped to form a box-like container.

In the manufacture of boxes made from comparatively stiff cardboard, it has been customary to crease the cardboard, as by dies, for the ready bending or folding of the material into a box form. Furthermore, it has been usual to form the entire box or carton from a single piece of board, whereby it is necessary to fasten only a few of the edges together, and in order that such a piece be thus utilized, creases both lateral and longitudinal must be made in the blank. In prior schemes for forming the creases, separate mechanism was utilized for each set of creases, the board being passed manually by an attendant to each of the mechanisms. Such a procedure is not only uneconomical from the standpoint of labor employed, but it is also time consuming as compared with the procedure rendered possible by the aid of my invention. It is thus one of the objects of my invention to provide a mechanism whereby the process of preparing the blanks for bending is very greatly facilitated.

I attain this object by making it possible to correlate the separate mechanisms so that the cardboard need be fed manually only through the first mechanism, and thence it continues automatically until it is finally discharged, having all its creases properly formed. In this way a very material saving is effected; in fact in an actual installation the labor is reduced to only a fraction, of the order of one fifth, for the same amount of work accomplished.

In making the creases, cooperating dies are used, which are caused to approach each other intermittently and engage the board placed between them. For making creases transverse to the movement of the paper, creasing rolls are used, that carry one or more dies on their periphery, so that for each revolution of the rolls, cooperating dies come together and press a crease across the cardboard. It is another object of my invention to make it possible to set the dies so that the creases made thereby are properly distanced with respect to each other as well as with respect to the transverse edge of the cardboard. By the aid of this feature of my invention, the task of setting up the machine for producing any spacing of lateral creases, is very materially reduced.

The longitudinal creases are produced by vertically reciprocating dies cooperating with stationary dies and extending longitudinally of the cardboard travel. It is another object of my invention to provide a mechanism that automatically places the sheets of cardboard in succession between the relatively moving dies, and then expels them after the creasing operation is completed. In this connection, my invention is not limited to any particular kind of material operated upon, nor to any particular form of dies, since it is obviously capable of application to other processes than that of creasing box blanks.

It is still another object of my invention to provide improved mechanisms for effecting adjustment of the various devices, which mechanisms in themselves are novel and useful.

It is still another object of my invention to provide a stamping or pressing mechanism (such as a creasing or printing device) that may be fed automatically by the aid of proper conveyor mechanism.

It is still another object of my invention to provide a readily adjustable set of dies for producing the longitudinal creases in the blank.

In many instances, it is desired to print labels or other matter on the external surface of the box; and of course this operation is most readily performed while the box blank is still in an unfinished state, just before the creasing is accomplished. It is still another object of my invention to provide a printing press or other mechanism that delivers the printed cardboard to the creasing mechanisms in succession, and that thus forms the first unit of the mechanism operating upon the cardboard material.

My invention possesses other advantageous features, some of which with the foregoing, will be set forth at length in the following description, where I shall outline in full that form of the invention which I have selected for illustration in the drawings accompanying and forming part of the present specification. Although I have shown in the drawings but one embodiment of my invention, I do not desire to be limited thereto, since the invention as expressed in the claims, may be embodied in other forms also.

Referring to the drawings:

Figures 1, 2, 3, and 4 are views mainly diagrammatic, which when placed together, form a complete plan view of the entire machine embodying my invention; the plan having such length that illustration of separate portions on separate sheets was essential, the figures in numerical order being arranged in right to left relation;

Figures 5, 6, 7, and 8 are side elevational views of parts of the machine corresponding in general respectively to Figures 1, 2, 3, and 4;

Figure 9 is an end elevational view, with a few parts in section, of the left hand end of the machine, and illustrates the manner in which the longitudinal creasing dies are set;

Figure 10 is a side elevation, partly broken away, of a planetary gear arrangement by the aid of which certain adjustments are made in the machine;

Figure 11 is a top plan view, partly in section, of some of the gear elements illustrated in Figure 10;

Figure 12 is a vertical sectional view of the arrangement shown in Figure 10;

Figure 13 is a sectional view, taken along plane 13—13 of Figure 12;

Figure 14 is a fragmentary elevational view, showing how the conveyors for moving the cardboard through the machine, are driven;

Figure 15 is a plan view of the guide channels, partly broken away, that guide the cardboard to the creasing rolls;

Figure 16 is a corresponding view of the channels that lead the cardboard from these rolls to the longitudinal creasers;

Figure 17 is an enlarged horizontal sectional view of a part of the guide channels shown in Figures 15 and 16, and illustrates one of the spring-pressed rollers engaging the edge of the sheets as they pass between the guides;

Figure 18 is a side elevational view of the device shown in Figure 17, with the roller shown in section;

Figure 19 is a vertical sectional view of a guide channel further illustrating the operation of the spring-pressed guide rolls;

Figure 20 is a fragmentary front view of a mechanism that may be operated manually to set parts of the machine relative to each other so as to produce the creases on the blank properly;

Figure 21 is a fragmentary vertical section of the mechanism shown in Figure 20;

Figure 22 is a fragmentary sectional view, taken at right angles to the section of Figure 21;

Figure 23 is a fragmentary elevation of a pair of creasing rolls and their drive as used in the machine;

Figure 24 is a fragmentary view, taken from the right of Figure 23;

Figure 25 is an enlarged view of a portion of a top creasing roll shown in Figure 23, with its associated caliper device for setting the dies carried thereby at desired points on the periphery, so as to produce creases spaced apart by the proper amount;

Figure 26 is a fragmentary view, similar to a portion of Figure 25 and illustrating the position in which the caliper device rests while it is being set and before actual use on the creasing die;

Figure 27 is a sectional view through the caliper and its support;

Figure 31 is a diagram illustrating the operation of the lateral creaser dies; and Figure 32 is a sectional detail of an adjustment feature.

Preliminary to the formation of creases in a blank, I show apparatus for printing advertising matter or the like thereon; and I associate the printing press with the creasing mechanism so that a complete unit in tandem is formed, whereby the paper that is fed into the printing press is delivered therefrom to the first element of the creasing mechanisms, whence it continues to travel through the machine and is finally delivered at the other end. Since these mechanisms are associated in this manner, the unit occupies considerable space. In general, I shall outline the construction and operation of the various elements of the mechanism in the order in which they operate on the cardboard paper. But as a preliminary to the detailed description, the general arrangement of the entire supporting structure had better be referred to in somewhat cursory fashion.

Figure 5:
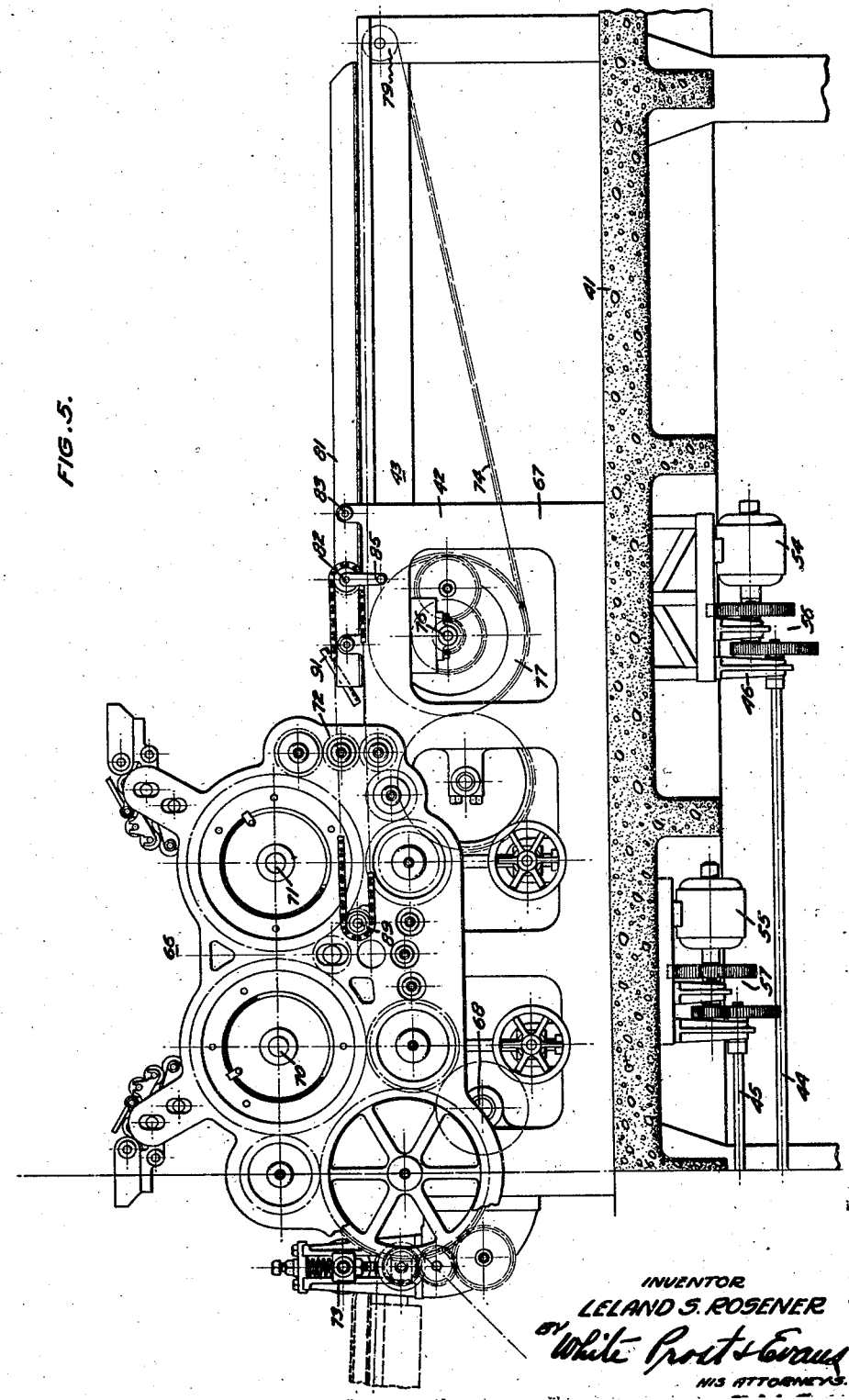

This structure is best elucidated by consideration of Figures 5, 6, 7, and 8, representing mechanism extending respectively from right to left. The flooring 41 in this instance is shown as of concrete, which may be appropriately reinforced to withstand the load imposed upon it. Furthermore the top surface may be treated or covered in any appropriate manner. On this flooring rests columnar frames and supporting legs, for example, such as the legs 42 (Fig. 5). These supports serve to hold not only the stationary parts of the mechanism but also all of the movable parts, either directly or by the aid of bearings located thereon. Beneath the flooring, several rotatably mounted shafts such as 44 and 45, are supported and serve to perform certain adjusting functions which will be described in detail later. Appropriate bearing blocks 46, 47, 48, 49, 50, 51, 52 and 53 are supported beneath flooring 41 for these shafts, and small electric motors 54 and 55 operate these shafts as desired through reduction gearing 56, 57.

Figure 2:
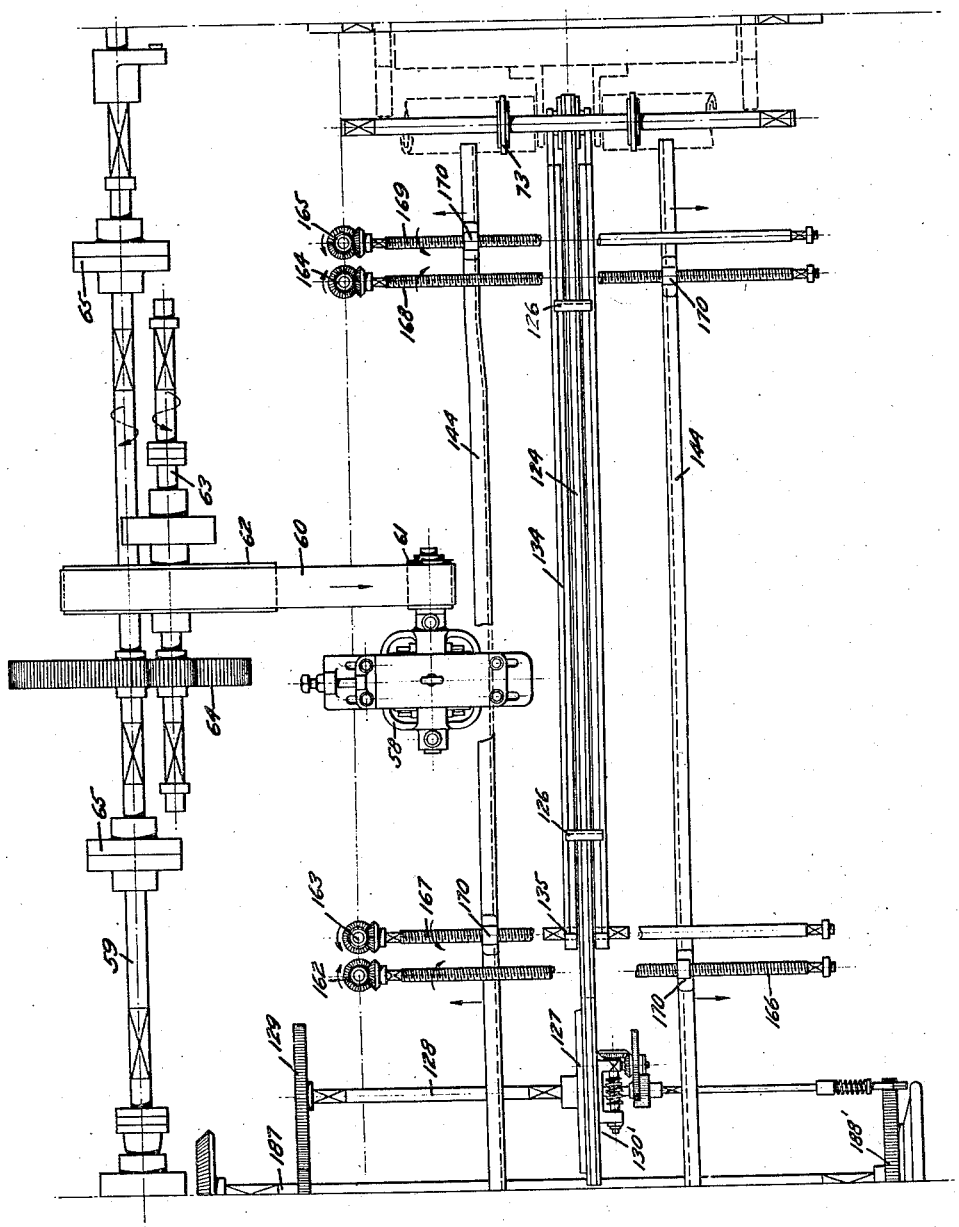

The main source of power for the mechanism is derived from a motor 58 shown in Fig. 2, which is located beneath the main platform of the machine or in any other convenient place. This motor is connected to drive the main drive shafting 59, through various power transmitting devices, such as the belt 60, pulyeys 61 and 62, countershaft 63, and gearing 64. Since the details of the drive form no part of the present invention, I shall describe no further elements thereof at this time, other than to mention that in view of the long axial length of shafting 59, I find it convenient to make it in sections united by couplings such as 65. This main shafting 59, as well as shafts 44 and 45 disposed below the machine, extend longitudinally thereof a sufficient distance to perform their functions satisfactorily.

The printing press 66 (Figs. 1 and 5) being in this instance the first to operate on the rectangular carboards that later constitute the box-blanks, is located at the right hand end of the machine. It may be of any standard construction; in this instance of the double roller type, and is supported on a rigid frame 67 placed on flooring 41. The drive for the cylinders is accomplished by the aid of shaft 68 driven from main shafting 59 by the aid of the bevel gearing 69. This shaft 68 is in turn geared or otherwise connected to the roll shafts 70 and 71. These latter shafts carry the impression platens, which are adjustable in a standard with respect to the rollers in a conventional manner common to the printing-press art. Feed and discharge rolls are also appropriately driven at the front and rear of the press, by the aid of mechanism generally indicated at 72 and 73. In Fig. 5 other parts of the mechanism are disclosed, but in view of the fact that the present invention resides in part in the correlation of the entire press to the other elements of the machine, it is deemed unnecessary to detail these parts in the specification.

Figure 1:
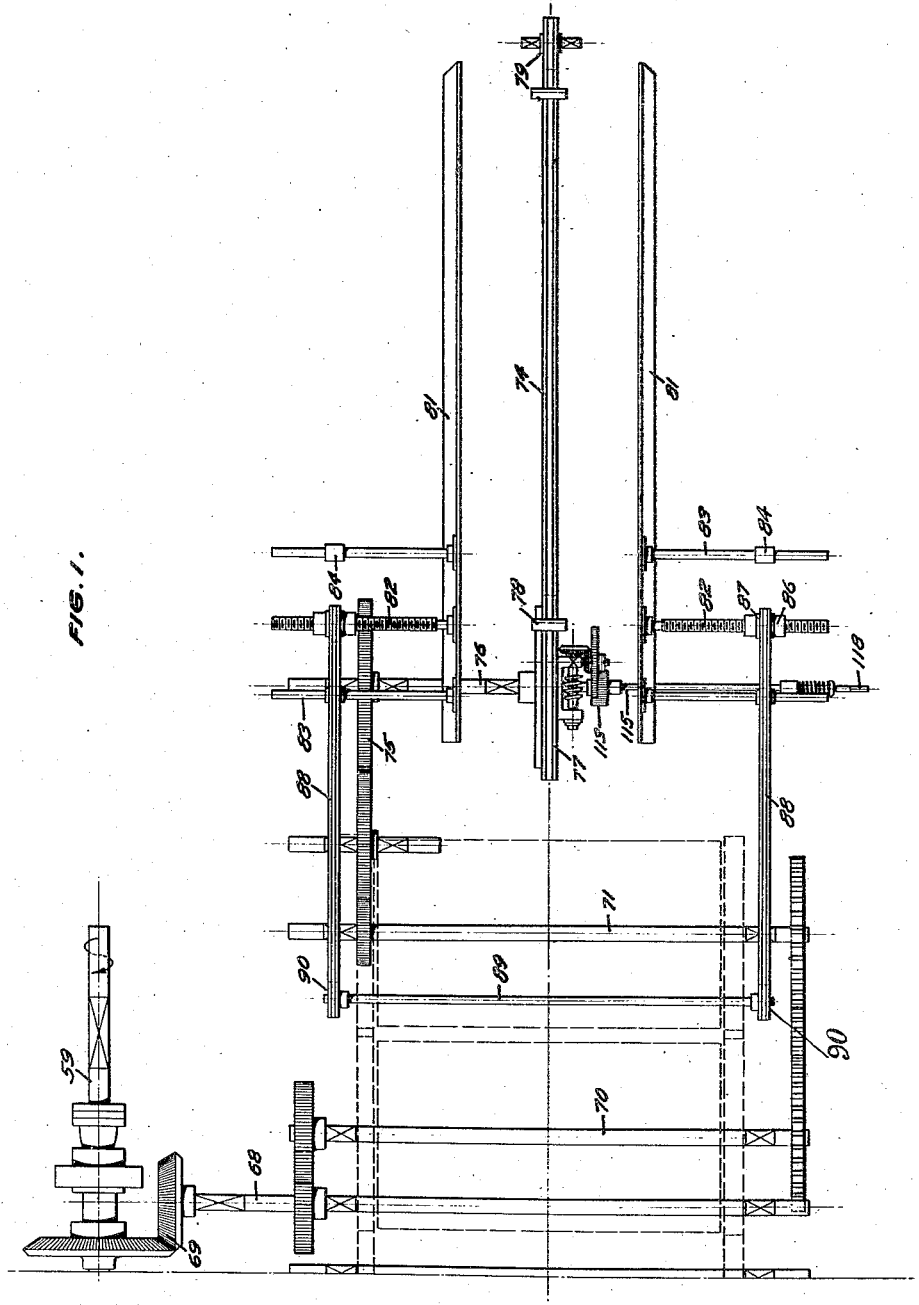

The mechanism for feeding the paper to the feed roll device 72 includes a moving endless conveyor 74 driven in time with the printing platen, as by the aid of the gearing 75 driving a shaft 76 that carries the sprocket wheel 77. Over this wheel there passes the conveyor chain 74, which loops over the idler wheel 79 at the right hand end of the machine. The cardboard to be printed is deposited on this conveyor chain, which runs in a slot in the center of the table 43; and in order that this chain may move the paper positively forward, I provide several pushers 78 fastened to links in the chain 74 which engage the cardboard 80 (Fig. 14) at its right hand edge. The length of the conveyor chain 74 is purposely chosen to be an even multiple of the circumference of the rollers of the printing frame, and the pushers 78 have their active surfaces spaced apart by the length of this circumference; in addition, the drive for the chain is so proportioned that for each revolution of the printing rollers, the chain 74 is advanced by an amount equal to the length of the roller circumference. In view of this arrangement, it is ensured that the printed matter will appear on each sheet of cardboard in substantially the same position with respect to the transverse edges of the sheet. The sheet 80 is guided at its longitudinal edges by the angle guide plates 81. These plates are adjustable to accommodate varying widths of sheets, as by the aid of the square-thread studs 82 fastened at their inner ends to the plates 81, as shown in Figure 1; and the guide rods 83 which ensure parallel motion of the plates 81. These rods pass slidably through stationary posts 84. The studs 82 may be simultaneously moved axially to move the plates 81 either toward or from each other by the aid of a hand crank 85 (Fig. 5) fastened to one of the rotating nuts 87 threaded on the studs and held against axial movement by the stationary standards 86 through which the studs pass; and motion transmitting mechanism between the studs, comprising the sprocket chains 88 passing over sprocket teeth on the nuts 87, shaft 89, and sprocket wheels 90 fastened to said shaft. As thus described, it is evident that rotating handle 85 will cause simultaneous rotation of nuts 87, and consequent axial movement of studs 82. As the sheet 80 advances between the guides 81, its front edge is prevented from curling upward by the slanting guard plate 91 (Fig. 5), having a lower edge near the top surface of the conveyor chain 74 opposite the bite of the feed roller device 72.

Of course the position of the printed matter relatively to the lateral edges of sheet 80 is determined by the relation of the pushers 78 with respect to a reference point at any place on the printing roller periphery that happens to be in its lowermost, printing position. This relation may be adjusted by properly adjustng the angular position of the printing platen; but for the sake of ease in adjustment, I prefer to accomplish this result by adjusting the pushers 78 with respect to the rolls, by the aid of a mechanism that can be operated even while the machine is in motion. For this purpose I have constructed a device for angularly adjusting the driving sprocket 77 with respect to the axis of shaft 76. This mechanism is most clearly illustrated in Figures 10, 11, 12, 13, and 14.

As shown in Figure 12, the sprocket wheel 77 is not keyed to shaft 76 but would be free to rotate thereon were it not for an adjustable clutching device which will now be described. The main elements of the clutch are the worm wheel 92 keyed to shaft 76, and a worm 93 carried on the side of the wheel 77 and meshing with the wheel 92. This worm 93 is so supported on wheel 77 that rotating it will cause the wheel 77 to move angularly with respect to wheel 92. The support for this worm is best disclosed in Figs. 11 and 12. A standard 94 is bolted to the side of wheel 77 by the aid of the through bolt 95, which passes through a large clearance hole in the base of standard 94, and the screw 99 that taps into a boss 100 carried by the standard 94 and journaled in the hole 101 in wheel 77. This standard carries at its ends the journals 96 and 97 in which the worm shaft 98 rotates. The accurate adjustment of the worm 93 relative to wheel 92 is secured by the aid of set screws 102 that pass through lugs 103 on wheel 77 and engage opposite sides of standard 94 near that place where the through bolt 95 is located. This adjustment of course takes place while this bolt is loosened, and after it is completed, the bolt is fastened in place. Rotation of set screws 102, as is evident, produces a relatively small rotation of standard 94 about the axis of screw 99. The bearing 96 is shown as formed internally of a short screw 104 that taps into the standard 94, for the purpose of permitting assembly of the device by passing the worm 93 through the tapped hole in the standard. The other bearing 97 extends through the standard 94, and accommodates the shank 105 of the worm 93. This shank extends entirely through the bearing 97, and also has a collar 106 that keeps it in proper axial position with respect to the bearing.

It is evident that angular adjustment of main sprocket wheel 77 can be secured by rotation of the worm 93. Furthermore this worm serves as a mechanical connection between the two wheels 77 and 92; and the drive from worm 93 to wheel 92 being of an irreversible nature, there is no danger that this mechanical connection can slip after the angular adjustment is performed. Although it would be possible to rotate the worm 93 by hand to secure this result, I prefer to provide mechanism whereby the adjustment may be performed by power supplied from shaft 76. For this purpose gearing is provided between shaft 76 and the worm 93, which may at will be rendered active. Thus a bevel gear 107 is keyed to the shank 105 of the worm 93, and is arranged to be driven by a bevel gear 108 loosely journaled on a stub shaft 109 projecting from the standard 94. This gear is in turn rotated by the aid of a spur gear 110 which is keyed, as shown at 111, Figure 13, to the hub of bevel gear 107. In Figure 12, the elements of this gear drive are illustrated in dotted lines, since they would in reality fall on that side of the plane of section of the figure which is opposite to the view shown. To hold the gears 108 and 110 against axial movement, a washer and nut arrangement 112 is provided.

The spur gear 110 is in mesh with a gear 113 that is arranged axially with respect to shaft 76; and if this gear be held stationary, it is evident that the planetary movement of gear 110 will cause this latter gear to rotate about its own axis, and produce an adjustment of the worm 93. However, during normal operation, the gear 113 is rotated as fast as gear 110 revolves in its planetary path, by being in driving connection with shaft 76. Under such circumstances there will be no relative movement of gears 110 and 113. The shaft 76 and gear 113 are connected by a spline connection 114, which is such as to permit engagement and disengagement at will, between them. For example, in the full line position of Figure 12, the spline connection is active to cause rotation of wheel 113. To render this connection inactive, the wheel 113 may be moved axially inward toward gear 92 to the dotted line position, where the splines 114 on shaft 76 are passed beyond the corresponding slots in the hub of gear 113. The face of this gear is made wide enough to cause it to be maintained in mesh with gear 110 for both positions. The gear 113, when in dotted line position, may be manually held against rotation, and thereby to serve analogously to a stationary rack on which gear 110 may rotate. When this is done, the worm 93 is being rotated.

The axial movement of gear 113 is accomplished by the aid of a rod 115 which is fastened at its inner end to the extended hub of wheel 113, as by the aid of the pin 116. A stationary guide 117 is provided for the rod 115, which also has a squared end 118 to permit engagement with a handle or wrench. Normally a spring 119 passing over the rod 115 urges the wheel 113 to engaging position with the splines 114. This spring is confined between the shoulder 120 on rod 115, forming a spring seat, and a face of the guide 117. To limit movement of the rod 115 to the left, a stop collar 121 is fastened to rod 115 and is intended to engage a face of the guide 117. As shown in Figure 1, the rod 115 is sufficiently long to extend to the side of the machine and permit ready manipulation of the adjustment device. This manipulation simply involves placing a wrench or handle on the squared portion of rod 115, urging the rod inward, and holding it stationary until the proper position of the pushers 78 is secured. Releasing the rod causes the spring 119 to urge rod 115 to the left, and the gear 115 to be again in driving connection with shaft 76. Of course this adjustment is intended to take place when the machine is in operation, but it could also be performed while shaft 76 is stationary, by urging rod 115 inward and then rotating it in either direction. Even while the machine is in motion, the speed of adjustment may be facilitated by manually rotating the rod 115 in a direction opposite to the rotation of shaft 76, or in a forward direction but with a speed faster than that of shaft 76.

The sprocket wheel 77 is thus adjustable angularly to space the pushers 78 in proper relation to the printing portion of the press rollers. The construction of the wheel is preferably such that the sprocket teeth are carried on a separate annular disc, as shown in Figure 12, bolted to the wheel spider. Furthermore, the wheel also carries a cam 122 that is intended to lift the rear edge of the sheet 80 clear of the pushers 78 (as shown in the dotted line position of Figure 14), at that instant when these pushers start their downward movement on the left hand side of wheel 77. In this way there is an assurance that these pushers will not urge the rear edges of sheets 80, downwardly, at a time when the front edge has already passed between the feed rolls 72 of the press 66. One tooth of the sprocket wheel 77 is cut away as shown at 123 in order to permit the pushers 78 to be received therein.

Figure 6:
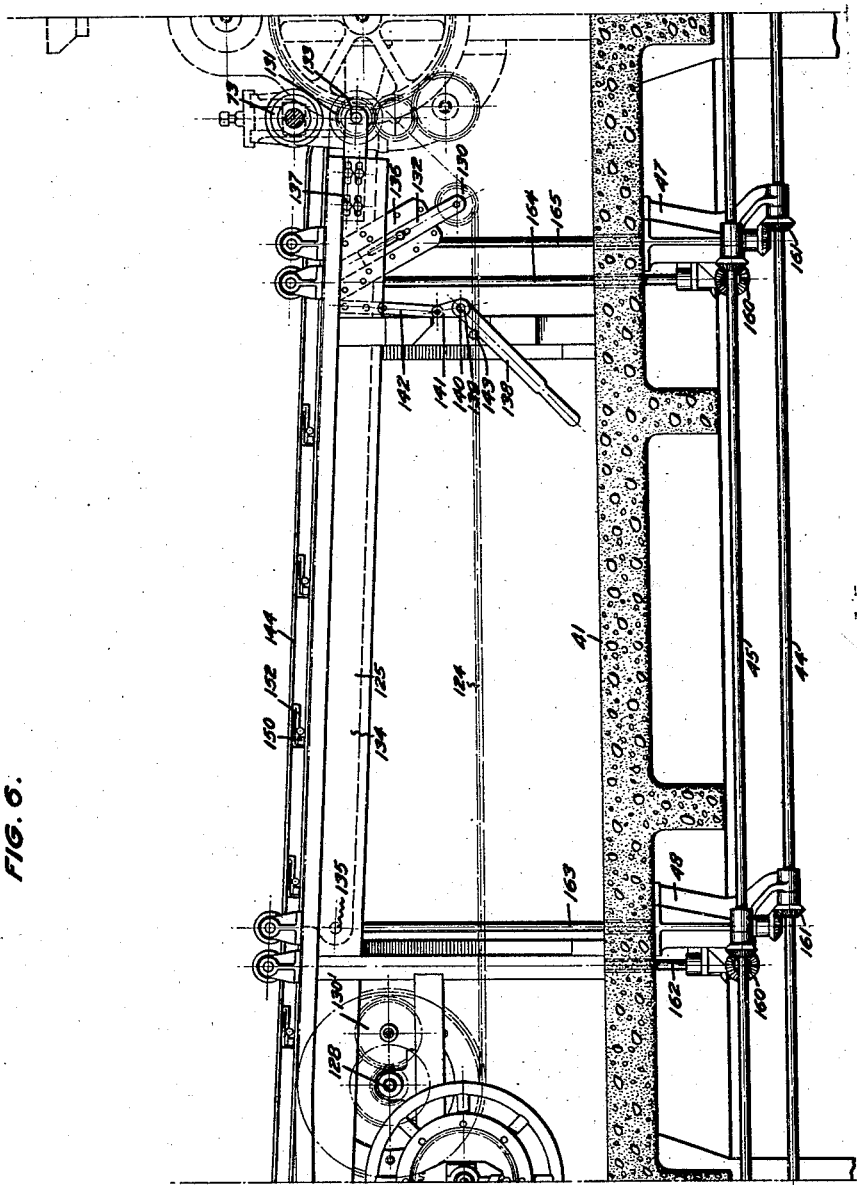

Once the positions of the pushers 78 and the printing rolls are properly adjusted, the printed matter will appear on the blanks in the same position on each. The printed sheets are then delivered from the press through the delivery rolls 73, where they are in turn dropped onto another movable conveyor 124 (Figures 2 and 6). This conveyor is disposed near a slot in the middle of the table 125 and also carries pushers 126. The conveyor 124 is in the form of a sprocket chain similar to chain 74 already described, and in fact the mechanical drive for this conveyor is entirely similar to the mechanism described in connection with chain 74. There is a driving sprocket 127 similar to sprocket 77; this driving sprocket has a driving shaft 128 driven by appropriate gearing 129 from the main shafting 59. Furthermore a manual adjustment device 130' similar in every respect to that illustrated in Figures 10, 11, 12, and 13, is provided for varying the relative positions of the pushers 126 with respect to the lateral creasing dies to be later described.

The conveyor 124 has a length that is proportioned to be an even number of times greater than the circumference of the lateral creaser rolls, and the pushers 126 are spaced apart by the length of this circumference, so that all of the sheets moved to the creaser rolls, for any adjustment, will always be creased at the same place. To take up whatever slack there may be in the conveyor, idler wheels 130 and 131 are used, which are mounted in spring or gravity pressed supports 132 and 133. Furthermore, I arrange the conveyor 124 in such a way that it may be lowered clear of the top of table 125, so that printed sheets delivered by rolls 73 will simply fall on the table without being carried to the creaser rolls. This arrangement is of benefit for example if only printing is required, or while the printing press is being adjusted. To effect this result, a bifurcated frame 134, pivoted at 135, is used to embrace the right hand portion of the conveyor, and to carry the seats 136 and 137 for the spring pressed supports 132 and 133. By swinging frame 134 downward so as to lower the tops of pushers 126 below the table, the conveyor mechanism may be rendered inactive. For accomplishing this, a hand lever 138 is pivoted at 139 in a stationary bearing 140, and has a short arm 141 pivoted at its free extremity to a rod 142 pivoted to frame 134. In the position of Figure 6, the frame 134 is elevated, and the lever 138 is held to keep the frame in this position by the aid of a stop pin 143. It is evident that rod or link 142 and arm 141 form a toggle link, which is in just about straightened position in Figure 6. To lower frame 134, the lever 138 is first lowered sufficiently to release pin 143, which may then be manually removed; and then lever 138 is slowly permitted to move upward and thus break the toggle.

It is essential that the sheet 80, in moving from the press 66 to the creasing rolls, be kept guided at its edges to move perpendicularly to the rolls. To accomplish this, the guide bars 144 are provided. These bars are shown most clearly in Figures 15, 17, 18 and 19, and they consist of a vertical leg having a top horizontal flange 145 and a bottom flat piece 146 upon which the sheet 80 may rest, as illustrated in Figure 19. At the right hand end of the guide bars 144, there are extensions 147 fastened to the bars 144 but having a wider separation than these bars. The fastening means includes the angle irons 148. The wider spacing of bars 147 gradually converges to that of bars 144, by the use of the spring plates 149 which join the adjacent portions of the bars. Furthermore, the actual guiding of the sheets is accomplished by spring pressed rollers 150 (Figures 17, 18, and 19). These rollers are rotatably mounted on a vertical shaft 151 formed as a shank of a screw engaging the free end of a vertically pivoted lever 152. The pivot for this lever is formed by the stud 153 supported from the horizontal flange 145. The rollers 150 extend through slots 154 in the bottom of bars 144 and are pressed outwardly by the aid of compression springs 155 mounted on the shanks of studs 156 passing through the lever 152. One end of the spring 155 rests against the lever 152 and the other abuts against the washer 157 held in place by nut 158. In order to limit the outward movement of roller 150, a stop 159 (Figure 17) is provided on lever 152 which is arranged to engage bar 144.

In order that varying widths of sheets be accommodated, it is necessary to provide an adjustment for the bars 144, so that they may be moved together or apart. This is effected by power in the present instance from the two shafts 44 and 45 which are disposed below the flooring 41. These shafts, by the aid of bevel gearing 160, 161, drive the vertical shafts 162, 163, 164 and 165. Shafts 162 and 164 are driven from shaft 45 and rotate in a direction opposite to that of shafts 163 and 165, driven from shaft 44. These shafts in turn drive the screw shafts 166, 167, 168 and 169 which extend across the machine and engage nuts 170 fastened to the tops of bars 144. Shafts 166 and 168 operate one bar, while shafts 167 and 169 operate the other, the direction of rotation being such that the bars travel in opposite directions. Of course motors 54 and 55 (Figure 5) are energized only when it is necessary to adjust these guides.

Figure 3:
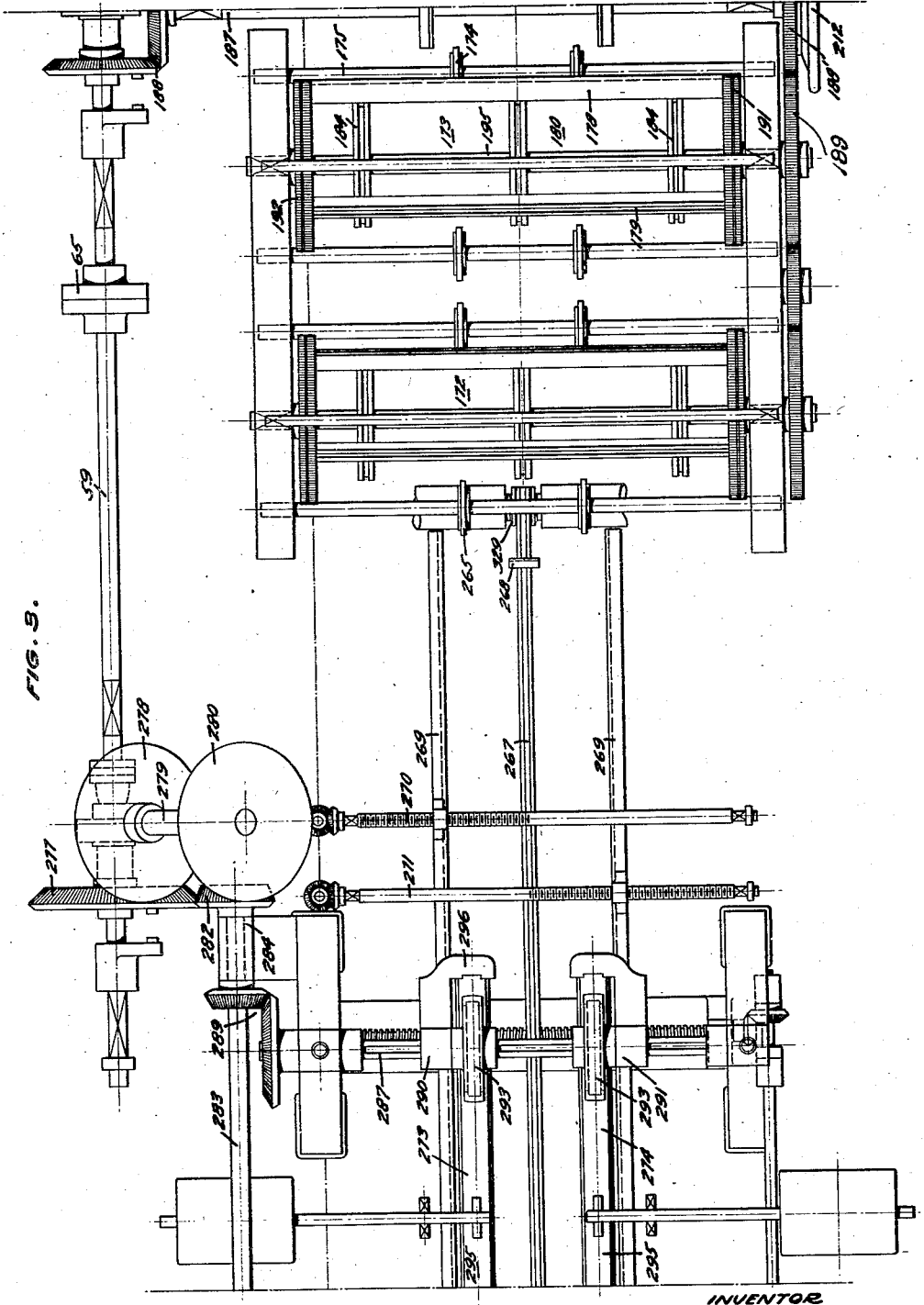
Figure 7:
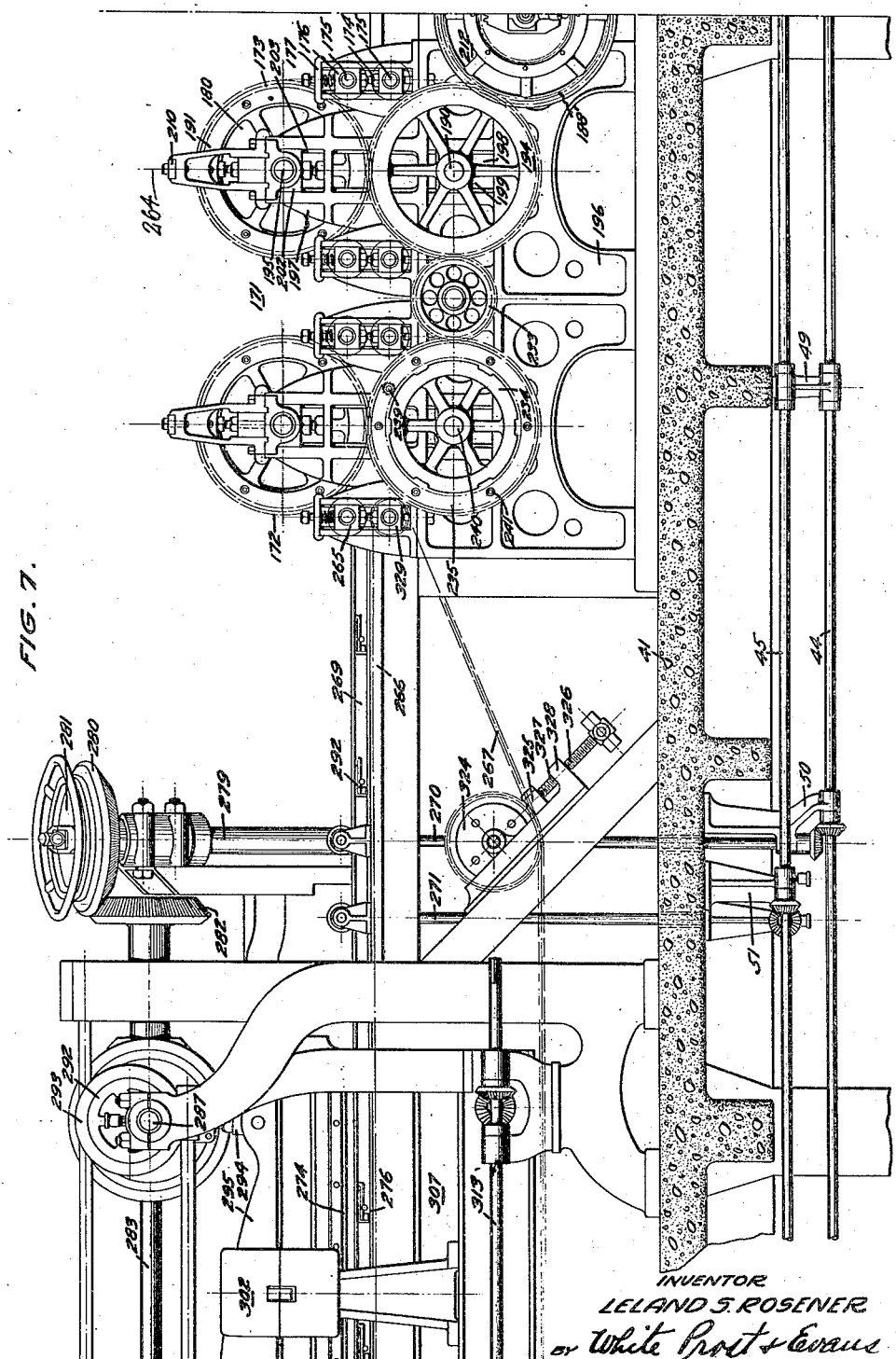
Figure 8:
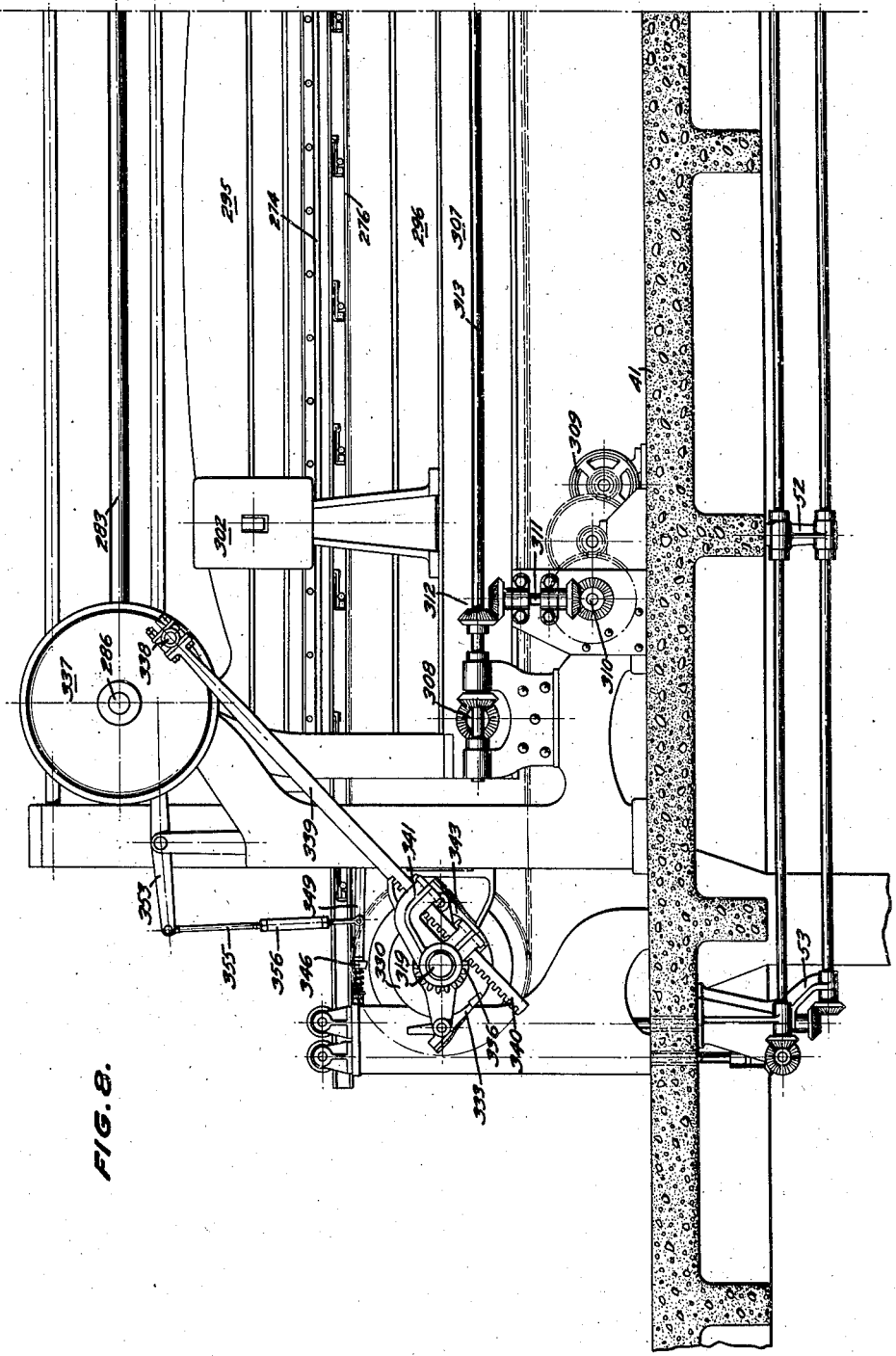

The sheet 80 after being deposited on the conveyor 124, is caused to enter between the lateral creaser mechanism 171 (Figure 7). In the present instance, this mechanism consists of two units, 172 and 173, substantially identical, and arranged to act on the sheet 80 in succession to put in all four lateral creases in the blank. The spaces formed by the creases correspond to the sides of the finished box, and to the end flap which is used for holding the box together. The sheet 80 first enters between the spring pressed rolls 174 that are fastened to shafts 175 in bearing blocks 176 vertically adjustable in the stationary standards 177. After the sheet leaves these rollers, it is successively acted upon by laterally extending creaser dies 178 and 179 (Figures 3 and 25) which are carried on the external periphery of a frame 180 rotating on an axis parallel to the lateral creasers as shown in Figure 24, a rotating frame 193 immediately below the frame 180 and similar thereto carries a pair of dies that cooperate with the dies 178 and 179 in succession at the lowest point of travel of these dies so as to press the sheet 80 between them as this sheet is passing between the upper and lower frames. For forming the creases in this manner, as shown by the diagram of Figure 31, the groove 181 of die 178 cooperates with the projection 182 of lower die 183 to crease the sheet 80. The dies may be entirely made of hardened material to withstand wear, as die 178; or else they may have hardened inset faces, as die 179. The dies are fastened on the rotating frames 180 by the aid of headed bolts 185 engaging the legs 186 of the dies and having their heads accommodated in the circumferential grooves 184 in the rotating frames 180. In fact these frames may be skeletonized to a great extent as illustrated in Figure 3, so as to consist mainly of separated thin discs in which these grooves 184 are cut, and arranged to be rotated about a common axis, parallel to the longitudinal dimension of the creaser dies.

The mechanism for driving the frames carrying the lateral creaser dies may best be described in connection with Figures 2, 3, 7, 23 and 24. The main shafting 59 drives the lateral shaft 187 by the aid of gearing 188. Near one extremity of this shaft there is clutched to it a spur gear 188' that meshes with the gear 189 driving the lower shaft 190. This shaft has rigidly fastened to it the lower frame 193 carrying the lower positive or male dies 183. The shaft also carries a pair of gears 194 which mesh with gears 191 and 192 placed at opposite ends of the upper frame 180, as shown in Figure 3. This upper frame is rigidly fastened to the upper shaft 195. As thus far described, and assuming that all of the lateral creaser dies are properly spaced on the frames 180 and 183, they will cooperate in pairs with each other as the lower shaft 190 is rotated, since this rotation serves to move both of the frames, and therefore the upper and lower dies, by the aid of the gearing just described.

Before proceeding with the mechanism that is used for adjusting the relative positions of the dies 178 and 179, so as to ensure the proper spacing of the creases in the sheet 80, it is advisable to describe in detail the structure that serves to support the upper and lower shafts 190 and 195. This is best illustrated in Figures 7, 23 and 24. A rigid frame-like support 196 resting on the flooring 41 holds the vertical standards 197 for both creaser mechanisms 172 and 173. Each standard 197 has a lower vertical guideway 198 in which guideway the bearing block 199 for the lower shaft 190 is placed. This block is held in rigid adjusted position by the aid of the bolts 200 which tap into stationary parts of the frame 196 and which have heads engaging opposite horizontal sides of the block 199. By turning these bolts, the shaft 190 may be leveled or adjusted vertically. To lock the bolts in adjusted position, the lock nuts 201 are provided. Once the machine is set up, this adjustment of shaft 190 need be varied only at very infrequent intervals.

The vertical position of shaft 195 may need to be varied in order to adjust the bite of the creaser dies for varying thicknesses f paper passing through the machine. This adjustment is of such small value that there is never any danger of separating the intermeshing gears 191 and 194 too greatly. To effect this adjustment, the upper bearing block 202 is vertically slidable in the upper guideway 203. A strap 204 closes the top of the guideway, and accommodates one of the adjusting bolts 205 that engages the top of block 202. Another adjusting bolt 206 taps into a horizontal portion of the supporting frame 196. Lock nuts 207 may be used as desired. The upper block 202 carries the support 263 which has forked legs 208 fastened as by bolts 209 to the ends of the block 202 when said block extends beyond the standard 197. This support 263 carries a lateral bar 210 which is useful in connection with the setting of the creasing dies, as explained hereinafter.

Since the frames 180 and 193 are connected to be driven from the same source of motion as the conveyor 124 which supplies the sheets to the creaser mechanisms, it is evident that the position of the first crease relative to the advancing edge of the sheet may be determined simply by adjusting the die-carrying frames relatively to the main drive shafting 59, or else by similarly adjusting the conveyor 124 with respect to the drive, as by the aid of the mechanism 130, described hereinbefore. I prefer, however, to take care of this setting or adjustment mainly by the aid of a mechanism 212 associated with shaft 187 and the gear 188' driven thereby, and which drives the creaser mechanism, which may be set manually to move this gear 188' with respect to the shaft and to lock it in any angular position desired. This mechanism is illustrated in detail in Figures 20, 21 and 22. The gear 188' is not keyed to shaft 187 directly, but instead, use is made of a gear wheel 212' having internal teeth, and a cooperating segment 213 that is slidable radially to engage and disengage the gear 212', and is mounted on shaft 187 so as to be rotated therewith. The internal gear 212' is mounted on the outer face of gear 188', as shown in Figure 21 by the aid of bolts 214, so that gears 188' and 212' are concentric, and rotate as a unit. The bolts 214 also serve to fasten a hand-wheel 215 to the gear wheels, whereby the wheels may be manually rotated while the sliding segment 213 is in the retracted position shown in the drawings. The radial movement of slide 213 is permitted by a guide 216 that is keyed to shaft 187, as shown in Figure 21. This guide has U-shaped grooves in each side that accommodate the two sides 217 of the segment 213 and permit them to move in a radial direction. This radial movement is effected by an eccentric 218 that is rotatable on the reduced end 219 of shaft 187, and is held from axial displacement by the washer 220 and nut 221. The eccentric fits into a bore in a crank arm 222 at the free end of which there is a pin 223 that engages the lower extremity of the segment 213. Thus by rotating the eccentric through 180°, the crank 222 is lifted or lowered by an amount equal to the eccentricity, and, due to the pin connection 223, the segment is correspondingly moved. In order to facilitate the rotation of the eccentric 218, a hand lever 224 is key to the hub of the eccentric. To lock the lever against movement while the machine is in operation or in process of adjustment, a spring pressed pin 225 carried by the lever is arranged to engage apertures 226 or 227 in the shaft end 219. For this purpose, of course, the hub of eccentric 218 is also apertured. The pin 225 may conveniently extend longitudinally of the lever 224, and be provided with an external ball end 228 to facilitate manual retraction of the pin from the locking apertures when it is desired to rotate the eccentric 218.

The adjustment of the gear wheel 188' by unclutching the segment 213 and manual rotation of wheel 215, provides for setting the creasing dies in relation to the pushers 126 on the conveyor 124 that carries the sheets to be creased to mechanism 172. However, this does not provide for any relative adjustment of the dies 178 and 179. This relative adjustment is secured by the aid of additional mechanism now to be described. As shown most clearly in Figure 24, there are a pair of gear wheels 229 and 230 near the inner side of each set of gears 191 and 194. These gears intermesh with each other, but are not keyed directly to shafts 190 and 195. The die 179 is fastened, as shown in Figure 25, to the inner face of gear 230, as by the aid of a bolt 231. It is also fastened in grooves 184 of discs 180 as described hereinbefore, but it is evident that by unloosening bolts 185, the gear 230 may be rotated and in this way move die 179 with respect to die 178 which is fastened rigidly to shaft 195, through the intermediary of the discs 180. Furthermore, since gears 229 are in mesh with gears 230, the lower positive die carried by these gears 230, is correspondingly moved after unloosening the bolts that hold it to lower discs 180. In this way, the upper and lower dies are kept in proper alinement with each other. After the adjustment between the dies is accomplished, the bolts 185 may again be tightened, and this tightening places them in proper condition for rotation as the shafts 190 and 195 rotate.

The rotation of gears 230 relative to gears 191 may be effected manually, and after adjustment, I prefer to fasten gears 191 and 230, as well as 194 and 229 securely together. This is accomplished by the aid of bolts 232 which pass through gears 191 and 194 and engage T slots in the sides of gears 230 and 229.

The creaser mechanism 172 has now been completely described. It is useful for making two of the total of four creases on the blank 80. The succeeding creaser mechanism 173 is substantially identical with that first described, and is connected to be driven from an idler gear 233 that meshes with gear 189 of the first creaser mechanism 172, and also with the corresponding gear 234 of the second creaser mechanism. It is considered unnecessary to detail the construction of this second set of creasers, except for a few parts that show how the sets of dies may be adjusted as a unit with respect to each other. This is accomplished by providing gear 234 with a relatively movable rim 235 (Figure 32) straddling a portion of the gear that also has spur teeth 236 thereon. The depending flanges 237 of rim 235 serve to accommodate a small pinion 238 meshing with teeth 236. When the pinion is manually rotated as by the aid of the squared shaft 239 extending through the flange of rim 235, the wheel 234 will be rotated while rim 235 remains stationary. Since wheel 234 is fast on shaft 240 that operates the entire creaser mechanism 173, it is evident that angular adjustment of this shaft is possible while the creaser mechanism 172 is stationary, whereby the position of the creases made by the mechanism 173 is adjusted relative to those made by mechanism 172. In order to ensure proper driving relation between gear 233 and shaft 240, I prefer to use several clamping bolts 241 that tighten rim 235 to wheel 234 when adjustment is complete. These bolts may have heads engaging circular T slots in the gear 234.

As stated heretofore, the distance between pushers 126 (Figure 2) is made equal to the circumference of the circle passing through the bite of the dies 178 and 179, and having the axis of shaft 195 as a center. In this way it is assured that each succeeding sheet 80 will have the same relation to the dies. This arrangement also makes it possible to use the calipers illustrated in Figures 25, 26, and 27, whereby the dies may be set in proper relative position without using the "cut-and-try" method to a substantial extent.

The two similar calipers for setting the dies, each include an arcuate strip 242 having a flange 243, forming a T-shape section as shown in Figure 27. Since the calipers are alike, only one has been illustrated assembled on its support 248. Near one end of the strip a device is provided for pivotally supporting it, and for this purpose the strip carries an ear 244 having a slot 245 that has its long side substantially parallel to the strip 242. Engaging this slot is a threaded piece 246, the axis of the threads being parallel to the long side of slot 245. This piece is pivotally supported by the aid of a shank 247 engaging the stationary clevis 248, fastened in a groove on the bar 210 above the dies. The piece 246 is of rectangular section, and the ear 244 is arranged to slide thereon as the strip 242 is rotated by the aid of a thumb screw 249 engaging this piece. This thumb screw is journaled in one end of ear 244 and is axially restrained by a collar 250. To hold the strip 242 against removal off the member 246, a bar 251 is provided, which may be held in place by a nut 252 engaging a threaded extension of member 246. As thus far described, it is evident that the angular position of strip 242 may be varied to a slight extent by the manipulation of screw 249, and this adjustment may be measured by the aid of graduations 253 on the strip 242, with which coacts an index mark 254 appearing on the bevelled face of bar 251.

The strip 242 carries the adjustable caliper bar 255 which straddles the flange 243. This bar has a slot 256 which is intended to coact with the active face of one of the dies 178 or 179, as illustrated in Figure 25. This bar is held on the strip 242 by the aid of a pin 257 that passes through any one of a series of apertures 258 in strip 242, as well as corresponding apertures in the side flanges of bar 255. Filler bars 259 (Figure 27) are preferably used between the strip 243 and these flanges, and screws 260 or other fastening means may be used to hold these bars tightly in place.

There are two supports 248 upon which caliper bars may be pivotally swung, as shown in Figure 27, whereby both dies 178 and 179 may be simultaneously adjusted so as to fall within the respective slots in the caliper bars 255. To assist the process of adjustment, there are associated with the apertures 258, a series of marked graduation lines 261 which indicate when the caliper bar is supported at any of these apertures, how far the center line of slot 256 would be displaced along the circumference from the vertical line 262, as measured for example in inches. To secure a finer setting, the thumb screw 249 is used, as explained heretofore, the graduations 253 being appropriately marked in fractions of spaces between lines 261, in this instance in fractions of an inch.

The construction of the caliper bars has now been completely described, and it is now possible to illustrate their use in setting the dies 178 and 179 at proper angular distances apart, and at proper spacing with respect to the pushers 126. Assuming that die 178 is held fast on the rings 180, while die 179 is unfastened with respect thereto, but is held fast to gears 230, and further that these gears are free to rotate with respect to gears 191 by having the fastening means 232 loosened, both dies may then be independently moved to fall into the slots in bars 255 on the calipers. Before this occurs, the caliper bars are loose on pivot 247, and may assume a position illustrated in Figure 26. It is thus evident that to secure the proper spacing of the dies, it is merely necessary to set these bars 255 in the proper locations on the strips 242, and to adjust if necessary, the strips for fine adjustment by the aid of thumb screws 249. Thus in the position of Fig. 25, it is evident that since die 179 is exactly under the zero mark of one strip 242, if die 178 is exactly under mark 15 of the other strip (not shown), the distance between the two dies is 15 inches. The thumb screw 249 may be used to decrease this distance by about an inch, by moving strip 242 coacting with die 179, to the right by the desired amount as shown by the aid of index 254. Similar modes of adjustment for any desired settings within the range of the instrument are apparent, and need no further elucidation. After the setting of the calipers is made, the dies may be independently moved as described heretofore to fall in their respective slots, and then all bolts are again tightened.

The foregoing process of adjustment is exactly similar to that provided for the succeeding dies on the mechanism 173. Although this adjustment takes care of the positioning of the dies with respect to each other, it does not take into account the positions of the creases with respect to the edges of the sheet 80. For this purpose it is necessary to release the gear 188 from shaft 187 by the aid of the device shown in Figs. 20, 21 and 22, whereby the discs 180 supporting the dies may be rotated independently of the drive shaft 187 and of the pushers 78. When this is accomplished, the frame carrying the dies is rotated until that die which is to be the first to act on the paper 80 is in its lowermost position, cooperating with the bottom male die, as shown for instance in Fig. 30. Then the shaft 187 is caused to rotate until the active face of one of the pushers is at the desired distance from the vertical line 262 passing through the cooperating dies. This distance is of course equal to the distance between the first crease and the lagging edge of the blank 80. After this adjustment is completed, the shaft 187 is again clutched to gear 188 by the aid of the mechanism shown in Figs. 20, 21 and 22.

This last adjustment is of course accurate within the space taken up by a tooth on the clutching segment 213 (Fig. 20). After a blank has been passed through, the fine adjustment may be secured by the aid of the calipers 255, and the thumb screws 249.

The adjustment of the dies in the succeeding mechanism 173 with respect to the pushers 126 is secured by the aid of the gear mechanism shown in Fig. 32. To effect this adjustment, the shaft 187 is rotated until the active face of one of the pushers 126 is at the desired distance from the vertical line 264 (Fig. 7). Then bolts 241 on driving gear 234 are loosened, and pinion 238 is rotated until the proper die on mechanism 173 is in its lowermost or biting position; the distance between line 264 and the nearest pusher 126 representing the distance from the lagging edge of blank 80 and that crease which is produced by the aid of the die placed in its biting position.

Once the dies are set as just described, the blanks 80 may move in rapid succession through both creaser mechanisms 172 and 173, and may be passed through the last set of spring rolls 265 onto the table 266 (Fig. 3). This table has a central slot underneath which an endless conveyor 267 (Figs. 2 and 7) moves, this conveyor also having a plurality of pushers 268 extending above the table surface to advance the sheets 80. In order to guide the blanks or sheets 80 toward the longitudinal creaser mechanism to be later described, guides 269 (Fig. 16) are provided, one at each side of table 266. These guides, being substantially identical with those shown in Fig. 15, for guiding the sheets to the lateral creasers, need not be described in detail. They are also adjustable, simultaneously with guides 147, by the aid of screw shafts 270 and 271 (Figs. 3 and 7) operated from the shafts 44 and 45. Thus whenever guides 147 are adjusted guides 269 are correspondingly adjusted. Spring pressed rollers 272 are also provided for the purpose explained in connection with guides 147, and their construction is similar to the rollers shown in Figs. 17, 18 and 19.

The pushers 268 urge the sheets underneath reciprocating dies 273 and 274 (Figs. 7, 8 and 9), which coact with stationary dies 275 and 276 (Fig. 9) to produce the longitudinal creases. The movement of the dies 273 and 274 is synchronized with the intermittent movement of pushers 268 so that the creasing is accomplished while these pushers are stationary, and the mechanism whereby this synchronization is effected, will be described in detail hereinafter. I shall now proceed to describe the mechanism whereby the dies 273 and 274 are reciprocated vertically.

As shown in Fig. 3, the main drive shaft 59 carries a bevel gear 277 that meshes with a bevel gear 278 fixed on a shaft 279 appropriately supported in stationary bearings. This shaft in the present instance is shown in an oblique position, and as carrying another bevel gear 280 at its upper end. This gear is clutched to shaft 279 through a device 281 (Fig. 7) that is entirely similar to that shown in Figs. 20, 21 and 22, whereby gear 280 may at times be rotated independently of shaft 279. Gear 280 drives a bevel gear 282 fast on a longitudinally extending shaft 283, supported in stationary bearings 284 (Fig. 3) and 285 (Fig. 4). From this shaft, the transverse shafts 286 and 287 (Figs. 3, 4, 7 and 8) are operated, as by the aid of gearing 288 and 289. Both these transverse shafts are appropriately supported in bearings, such as 290 and 291, forming part of the supporting framework.

Upon each of the transverse shafts 286 and 287 there are splined a pair of eccentrics 292 (Fig. 28) which operate in eccentric straps 293. These straps reciprocate the connecting rods 294, pivotally connected to the top webbings of the die support 295. In this manner, the dies 273 and 274 are simultaneously reciprocated, once for each revolution of the transverse shafts 286 and 287.

The supports 295 are guided at each end in the heavy frames 296, there being a pair of such frames, one right and one left near each of the shafts 286 and 287. Each framework has an upper arm 297 (Fig. 9) that encompasses the respective shaft 286 or 287, to serve as a support. It also has a horizontal extension 298 in the inner face of which groove 299 (Fig. 28) is cut to guide the die support 295. Furthermore the lower dies 275 and 276 are supported by the aid of the horizontal extensions 300 (Fig. 9) on these frames. The closeness of approach of the upper to the lower dies is adjusted by lengthening or shortening the connecting rods 294, said rods being in threaded engagement with clevises 301 (Fig. 28) pivoted to the top die supports 295. Furthermore in order to relieve the transmission from as much strain as possible, a pair of counterweights 302 are provided for each reciprocating die and its supports. These counterweights, as shown diagrammatically in Figs. 3 and 4, are adjustably mounted on rods 303, pivoted at about their central point on a bearing stationary with respect to the respective frames 296, and also pivoted at their inner ends to the upper die supports 295.

The frames 296 are so mounted that they may be moved together or apart, whereby the distance between the longitudinal creases may be set. It is for this reason that the eccentrics 292 are splined for axial movement along the shafts 286 and 287. Each frame rests on a long support 304 which is slidable on grooves 305 formed in the large blocks 306 fastened to the stationary supporting frame 307. Extending transversely through the long supports are long threaded shafts 308 that are provided with right and left hand threads. Thus when the shafts are rotated, the threads cause opposite movements of the frames 296, either toward or from each other. These shafts are power operated at will from a small electric motor 309 (Fig. 9) which rotates the shaft 310, geared to a short vertical shaft 311. This vertical shaft in turn is connected as by bevel gears 312, to the long horizontal shaft 313. Finally this horizontal shaft is connected by bevel gears to the threaded screw shafts 308, as shown in Figs. 3 and 4. By controlling the direction and amount of rotation of motor 309, the distance between the longitudinal creases may be adjusted.

In order to facilitate this adjustment, a scale 314 (Fig. 9) is provided. This scale is fastened to one of the extensions 298, and is slidable in an index member 315 held on the opposite extension 298. The index on member 315 tells directly, in inches, the separation between the longitudinal dies 273 and 274. Rules or scales 316 are also provided, one at each side, for determining the separation between the side guides 269 between which the blank 80 is moved. These scales are fastened at their inner ends to the guides 269, and cooperate with index members 317 carried by the frames 296. These members tell directly the distances between the longitudinal creases and the edges of the sheet 80.

In order to perform the operation of creasing the blanks longitudinally, it is essential that these blanks be fed one at a time between the longitudinal creaser dies. The mechanism for moving the conveyor chain 267 intermittently to effect this feeding as well as the ejection of the finished blank, is disclosed mainly in Figs. 3, 4, and 28. The conveyor chain 267 is an endless one, and carries the pushers 268 spaced apart an equal distance. At the delivery end of the machine, the chain passes over a driving sprocket wheel 318 (Figs. 28 and 30) keyed to a transverse shaft 319. This shaft is journaled near its ends in appropriate stationary bearings 320 and 321, formed in bearing blocks 322 and 323. An idler sprocket wheel 324 (Fig. 7) is also provided for the lower reach, on a movable support 325 which may be adjusted by a manually operated screw shaft 326. This shaft engages a threaded boss 327 on support 325, and is held against axial movement in a stationary bearing block 328. At the rear end, the conveyor chain 267 passes over another idler 329 journaled on a stationary transverse shaft.

Figure 29:
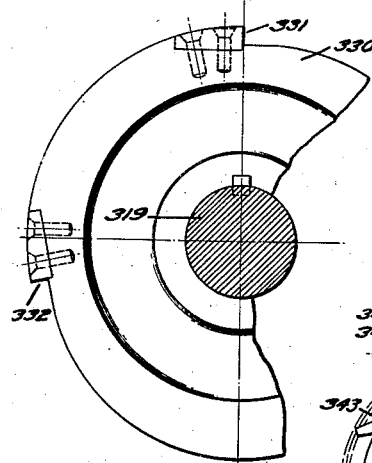
Figure 29 is a fragmentary side view of one element of the drive shown in Figure 28.
Figure 30:
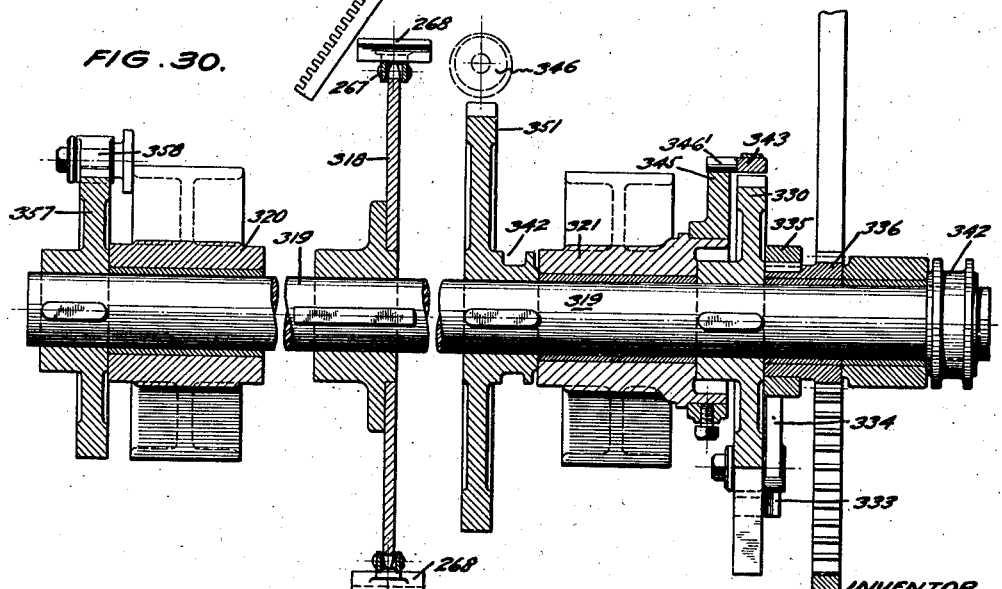
Figure 30 is a fragmentary sectional view taken along plane 30—30 of Figure 28.

A ratchet wheel 330 is keyed to shaft 319 immediately outside of bearing 321; as shown in Fig. 29, this wheel has a pair of oppositely arranged active faces 331 and 332. The face 331 is the driving face, which is arranged to be engaged by a pawl 333 to rotate the shaft 319 intermittently. This pawl is spring pressed, and is carried at the extremity of an arm 334 fastened to a collar 335 (Fig. 30). This collar in turn is fastened to the hub of a pinion 336 which is mounted for free rotation with respect to shaft 319. It is thus evident that rotation of this pinion in a counter-clockwise direction will cause rotation of shaft 319, due to the engagement of pawl 333 with the face 331.

The rotation of this pinion is effected from the shaft 286 which also imparts a reciprocating motion to the creasing dies, as described hereinbefore. For this purpose, shaft 286 carries at one extremity a crank disc 337 having a crank pin 338. Pivoted on this crank pin is a long connecting rod 339 having teeth 340 at its free extremity forming a rack that engages pinion 336. An oscillating frame 341 is loosely mounted on shaft 319 to serve as a guide for this rack, as its angular position changes with rotation of pin 338. The rack 340 of course imparts a reciprocating movement to pinion 336 as shaft 286 rotates, but only the counterclockwise movement is effective in advancing the conveyor 267, due to the pawl and ratchet arrangement. Furthermore, the throw of the pin 338 is so proportioned with respect to the diameters of driving sprocket 318 and of pinion 336 that this sprocket is rotated through one complete revolution by the pawl arrangement. This sprocket wheel is of such circumference that this movement is equal to the spacing of the pushers 268. It is also understood that the angular position of crank pin 338 is so chosen that the conveyor 267 is moved only while the dies are separated.

In Fig. 30, the axial arrangement of the various driving elements is clearly disclosed. In this figure a pair of guard collars 342 is used to maintain the axial assembly properly in place.

The sudden reciprocations of gear 336 may at times impart such a large impact to the ratchet wheel 330 that this wheel would travel away by inertia from the driving pawl. In this way a series of impacts would be imparted to the shaft 319, and a corresponding jerky operation would result. In on order to ensure against such occurrences, use is made of the other active face 332 of the wheel 330 to prevent this wheel from leaving pawl 333. A pawl 343 similar to pawl 333 is arranged to coact with the face 332. This pawl is pivotally mounted on the extremity of arm 344 carried on the collar 335 that also supports the other arm 334.

Figure 28:
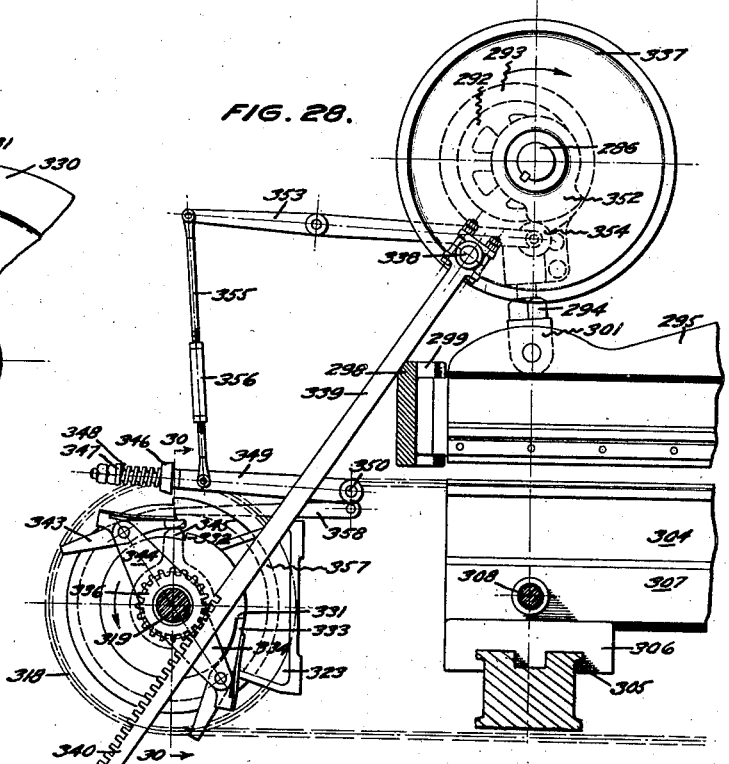
Figure 28 is an enlarged side view, partly diagrammatic and in section, of the left hand end of the entire machine, and illustrates the means for advancing the sheets to and from the longitudinal creasing dies.

The pawl 343 is active only when the wheel 330 is being rotated, and prevents its overrunning. In order to release the pawl 343 as soon as the shaft 319 makes one complete revolution, a stationary cam 345 is provided, adjacent the wheel 330, that engages the horizontal extension 346' of the pawl 343 when the wheel 330 has completed the revolution and just prior to the reversal of gear 336. In this way, the pawl 343 can pass over the wheel 330 without rotating it in a clockwise direction. The position of Fig. 28 is that where the gear 336 and pawls 333 and 343 are about to move shaft 319 forward.

As the pinion 336 reverses, the pawl 333 of course leaves the active face 331; nevertheless, due to inertia, the shaft 319 and its accompanying mechanism may continue to move forward. To buff this movement, I provide a resilient buffer mechanism, comprising a pawl member 346 (Fig. 28) that is slidable on a rod 347 but is urged to the right by a spring 348. It is limited in its movement by a stop shoulder on a rod 349, which is pivotally supported at its other extremity, as shown at 350. This pawl is arranged to be moved into the path of travel of a ratchet wheel 351 which is fixed to shaft 319, just as soon as the ratchet 333 leaves the active face 331. In this way, the kinetic energy of the moving system is stored as potential energy by compression of spring 348; and a few small amplitude oscillations result when this energy is alternately converted from potential to kinetic, and back again.

The pawl member 346 is ordinarily kept out of the path of movement of stop ratchet wheel 351, but arm 349 at the proper instant is periodically permitted to drop to bring the pawl into active position. This is effected by the aid of a cam 352 that is keyed to shaft 286. This cam acts to reciprocate a pivoted lever 353, one end of which carries a cam follower roller 354, and the other end, a link 355. This link is pivoted at its lower extremity to arm 349, and by the aid of a turnbuckle arrangement 356, its length may be adjusted to suit the desired conditions. It is evident that the cam 352 will depress the right hand end of arm 353 and raise the pawl 346 out of the path of the wheel 351 just before the shaft 319 is to be rotated in a counterclockwise rotation; but it will permit the pawl to drop soon thereafter, so as to buff the forward movement after the drive reverses.

The shaft 319 also carries another stop ratchet wheel 357 with which a pivoted pawl 358 is intended to coact. This arrangement serves to prevent the conveyor mechanism from moving too far in a reverse direction.

The intermittent advances of the conveyor 267 serves not only to place the blanks 80 between the creasing dies, but also to eject the blanks after the creasing is performed. In other words, a single forward movement of the conveyor serves to move two blanks—one out of the machine, and the other into the creasing position.

Once the machine is set up for a perpendicular size of box blank, as described, it requires merely a pair of operatives— one to feed the blanks 80 one at a time onto the conveyor 74, and another to remove at times the creased and printed blanks accumulated at the delivery end of the machine, as they are ejected by the intermittently moving conveyor 267. By thus combining the printing mechanism, the lateral creaser mechanism and the longitudinal creaser mechanism, the production is speeded up very greatly; the total labor is reduced to a small fraction of that necessary by the old method of operation. This is due mainly to the fact that one feeding and one delivering operation are all that is required, whereas in the old arrangement, three separate feedings must be manually accomplished, and as many removals from the delivery end of each unit. The saving in time thus effected results mainly from the use of mechanism co-ordinating the operations of the various units, so that they synchronize harmoniously for the purpose intended.

I claim:

1. In combination, a pair of mechanisms for performing operations upon a blank, a conveyor arranged between the mechanisms for feeding the blanks from the delivery end of one mechanism to the receiving end of the other, and means whereby the feeding of the blank to the second mechanism may be adjusted with respect to this mechanism, said means being operable while the machine is in operation.

2. In combination, a pair of mechanisms for creasing a cardboard box blank, a conveyor arranged between the mechanisms for feeding the blanks from the delivery end of one mechanism to the receiving end of the other, and means whereby the feeding of the blank to the second creaser mechanism may be adjusted with respect to the first mechanism while the mechanisms are in operation.

3. In combination, lateral creaser rolls, longitudinal creaser dies, and an intermittently operated conveyor arranged between said two creaser mechanisms.

4. In combination, a lateral creaser mechanism for a box blank, a reciprocating longitudinal creaser mechanism, an endless conveyor for feeding blanks through the longitudinal creaser mechanism, said conveyor having one or more pushers for engaging the lagging edge of the blank, and means for adjusting the positions of the conveyor pushers with respect to the position of one of the creaser mechanisms.

5. In combination, a device for printing on box blanks, a creaser mechanism for the box blanks, and driving means therefor, means for feeding blanks delivered from the printing device to the creaser mechanism, and driving means therefor, and means for synchronizing the operation of the feeding means and of the printing device.

6. In a combined printing device and creaser mechanism for box blanks, adjustable means for coordinating the operation of the two mechanisms, whereby a blank may be moved continuously through both mechanisms.

7. In combination, a mechanism for operating on material, a conveyor for feeding material to the mechanism, a common driving means for the mechanism and conveyor, and means for advancing or retarding the conveyor with respect to the driving means while the mechanism is in operation.

8. In combination, a mechanism for operating on material, a conveyor for feeding material to the mechanism, a common drive for the mechanism and conveyor, and means for advancing or retarding the conveyor with respect to the mechanism, comprising an adjustable clutch operable during rotation of the common drive and interposed between the drive and the conveyor.

9. In combination, a mechanism for operating on material, a conveyor for feeding material to the mechanism, a common drive for the mechanism and conveyor, and means for advancing or retarding the conveyor with respect to the mechanism, comprising a worm and gear clutch between the drive and the conveyor.

10. In combination, a mechanism for operating on material, a conveyor for feeding material to the mechanism, a source of motion for the mechanism and the conveyor, a shaft driving the conveyor, an adjustable connection between said shaft and the source of motion, for advancing or retarding the conveyor with respect to the mechanism, and means for adjusting said connection while it is in motion.

11. In combination, a mechanism for operating on material, a conveyor for feeding material to the mechanism, a source of motion for the mechanism and the conveyor, a shaft driving the conveyor, and an adjustable connection between said shaft and the source of motion, for advancing or retarding the conveyor with respect to the mechanism, comprising an adjustable clutch operable during rotation of the common drive and interposed between the shaft and the source of motion.

12. In combination, a mechanism for operating on material, a conveyor for feeding material to the mechanism, a source of motion for the mechanism and the conveyor, a shaft driving the conveyor, and an adjustable connection between said shaft and the source of motion, for advancing or retarding the conveyor with respect to the mechanism, comprising a worm gear fastened to the shaft, a wheel loosely mounted on the shaft for engaging the conveyor, and a worm carried by the wheel and cooperating with the worm gear.

13. In combination, a mechanism for operating on material, a conveyor for feeding material to the mechanism, a source of motion for the mechanism and the conveyor, a shaft driving the conveyor, and an adjustable connection between said shaft and the source of motion, for advancing or retarding the conveyor with respect the mechanism, comprising a worm gear fastened to the shaft, a wheel loosely mounted on the shaft for engaging the conveyor, a worm carried by the wheel and cooperating with the worm gear, gearing between the worm and the shaft, said gearing including a slidable gear wheel that by axial movement may be clutched or unclutched from the shaft, and means for axially moving this gear wheel.

14. In a machine for operating on box blanks including an operating mechanism and a conveyor for feeding the blanks into the mechanism, means for adjusting the phase relation between the conveyor and the mechanism comprising a conveyor drive shaft, a worm gear fastened to the shaft, a wheel loosely mounted on the shaft, a worm carried by the wheel and cooperating with the worm gear, gearing between the worm and the shaft, said gearing including a slidable gear wheel that by axial movement may be clutched or unclutched from the shaft, means for axially moving this gear wheel and driving means geared to the loosely mounted wheel.

15. In a device for adjusting the relative position of creasing dies on a creaser roll, an arcuate strip, and a member arranged to engage a die, adjustably mounted on said strip.

16. In a device for adjusting the relative position of creasing dies on a creaser roll, an arcuate strip pivotally mounted near one extremity, and a caliper jaw for coacting with the die adjustably mounted on the strip.

17. In a device for adjusting the relative position of creasing dies on a creaser roll, an arcuate strip, and a member slidably mounted on the inner portion of the strip for engaging a die.

18. In a device for adjusting the relative position of creasing dies on a creaser roll, an arcuate strip, means for pivotally supporting said strip near one extremity thereof, a member slidably mounted on the strip for engaging a die, means for holding the member on the strip at any of a number of locations, and means providing a finer adjustment of the member with respect to the pivotal support.

19. In a device for adjusting the relative position of creasing dies on a creaser roll, an arcuate strip, means for pivotally supporting said strip near one extremity thereof, a member slidably mounted on the strip for engaging a die, means for holding the member on the strip at any of a number of locations, and means providing a finer adjustment of the member with respect to the pivotal support, comprising means for adjusting the strip with respect to its stationary pivotal support.

20. In combination, a reciprocating creaser mechanism, a conveyor for moving sheets to the mechanism, and means for intermittently operating the conveyor between operations of the creaser, comprising a pawl and ratchet device, a reciprocating rod for operating the device, and operated by the creaser mechanism, a stopping pawl for preventing the ratchet wheel from leaving the driving pawl, and means for releasing the stopping pawl upon reversal of the ratchet movement.

21. In combination with a device for operating periodically on box-blanks, an intermittently operated conveyor for feeding box-blanks in time with the device, and means for resiliently buffing the movement of the conveyor at the end of its desired travel.

22. In combination with a device for operating periodically on box-blanks, a conveyor, a mechanism for intermittently actuating the conveyor for feeding box-blanks in time with the device, and means for resiliently bringing the conveyor to rest at the end of its desired travel.

23. In combination with a device for operating periodically on box-blanks, a conveyor, a mechanism for intermittently actuating the conveyor for feeding box-blanks in time with the device, a projection carried by the conveyor, a cooperating projection arranged to arrest the conveyor movement, and means for resiliently supporting said second projection.

24. In combination with a device for operating periodically on box-blanks, a conveyor, a mechanism for intermittently actuating the conveyor for feeding box-blanks in time with the device, a projection carried by the conveyor, a cooperating projection arranged to arrest the conveyor movement, and means operated by the actuating means for bringing the projections out of engagement.

25. In combination with a device for operating periodically on box-blanks, a conveyor, a mechanism for intermittently actuating the conveyor for feeding box-blanks in time with the device, a projection carried by the conveyor, a cooperating projection arranged to arrest the conveyor movement, means for resiliently supporting said second projection, and means operated by the actuating means for bringing the projections out of engagement.

26. In a creasing mechanism for sheets, creaser rolls for imparting one or more lateral creases to the sheets, reciprocating creasers for imparting one or more longitudinal creases, driving means for the creasers, and means for correlating the operation of the rolls and reciprocating creasers for successively operating on the sheets.

27. In a creasing mechanism for sheets, creaser rolls for imparting one or more lateral creases to the sheets, reciprocating creasers for imparting one or more longitudinal creases, a conveyor mechanism disposed between the lateral and longitudinal creasers, and an intermittent drive for the conveyor mechanism timed to feed sheets successively from the lateral creaser to the longitudinal creaser.

28. In a creasing mechanism for sheets, creaser rolls for imparting one or more lateral creases to the sheets, reciprocating creasers for imparting one or more longitudinal creases, a conveyor mechanism disposed between the lateral and longitudinal creasers, an intermittent drive for the conveyor mechanism timed to feed sheets successively from the lateral creaser to the longitudinal creaser, and a common driving means for the creaser mechanisms and the conveyor.

29. In a machine for operating on sheets from which containers are to be made, a printing device, a creaser mechanism, a conveyor between the printing device and the creaser, a common driving means for the printer, creaser, and conveyor, and means for retarding or advancing the conveyor with respect to the other mechanisms while the mechanisms continue to operate.

30. In a machine for operating on sheets from which containers are to be made, a printing device, a lateral creaser, a longitudinal creaser, a conveyor between the printing device and one of the creasers, a conveyor between said creaser and the other creaser, a common drive for the printing device, the creasers and the conveyors, and means for retarding or advancing either conveyor with respect to the other mechanisms.

31. In a machine for operating on sheets from which containers are to be made, a printing device, a lateral creaser, a reciprocating longitudinal creaser, a conveyor between the printing device and the lateral creaser, an intermittently operated conveyor between the lateral creaser and the reciprocating longitudinal creaser, and a common drive for the printing device, the creasers and the conveyors.

32. In a machine for operating on sheets from which containers are to be made, a printing device, a lateral creaser, a reciprocating longitudinal creaser, a conveyor between the printing device and the lateral creaser, an intermittently operated conveyor between the lateral creaser and the reciprocating longitudinal creaser, a common drive for the printing device, the creasers and the conveyors, and means for retarding or advancing either conveyor with respect to the other mechanisms.

33. In combination, a plurality of mechanisms for operating on material, a plurality of endless conveyors for the material, means for driving the conveyors and mechanisms in predetermined angular relation to one another, and means for adjusting the relation, said adjusting means being operable while the machine is in operation.

34. In combination, a plurality of mechanisms for operating on box-blanks, positive conveyors for the box-blanks, a common driving means, driving connections from the common driving means to the conveyors and mechanisms, and precision adjusters interposed in said connections whereby the angular relations of the driven element may be altered.

35. A creaser roll mechanism for operating on box-blanks comprising a creaser roll provided with dies, a conveyor, and driving means, in combination with means for adjusting the dies relative to the roll, and means for adjusting the roll relative to the driving means, whereby the position of the creases formed in a box-blank may be determined.

36. A creaser roll mechanism for operating on box-blanks comprising a creaser roll provided with dies, a conveyor, and driving means, in combination with means for adjusting the dies relative to the roll, and means for adjusting the roll relative to the driving means, and means for adjusting the position of the conveyor relative to the roll whereby the position of the creases formed may be uniquely determined.

37. In a machine for operating on box-blanks including an operating mechanism and a conveyor for feeding the blanks to the mechanism, means for synchronizing the conveyor and mechanism comprising a driving shaft geared to said mechanism, a gear fixed to the driving shaft, a conveyor shaft, a loose gear on the conveyor shaft in mesh with the driving shaft gear, a clutch member fixed to the conveyor shaft and geared to the loose gear, and manual means for controlling the relative rotation between the clutch member and loose gear.

38. In a machine for operating on box-blanks including an operating mechanism and a conveyor for feeding the blanks to the mechanism, means for synchronizing the conveyor and mechanism comprising a driving shaft geared to said mechanism, a gear fixed to the driving shaft, a conveyor shaft, a loose gear on the conveyor shaft in mesh with the driving shaft gear, a clutch member fixed to the conveyor shaft and positively geared to the loose gear, and manual means for controlling the relative rotation between the clutch member and loose gear.

39. In a machine for operating on box-blanks including an operating mechanism and a conveyor for feeding the blanks to the mechanism, means for synchronizing the conveyor and mechanism comprising a driving shaft geared to said mechanism, a gear fixed to the driving shaft, a conveyor shaft, a loose gear on the conveyor shaft in mesh with the driving shaft gear, a clutch member fixed to the conveyor shaft, a coupling gear connecting the clutch member and loose gear, and manual means for rotating said coupling gear.

40. In a machine for operating on box-blanks including an operating mechanism and a conveyor for feeding the blanks to the mechanism, means for synchronizing the conveyor and mechanism comprising a driving shaft geared to said mechanism, a gear fixed to the driving shaft, a conveyor shaft, a loose gear on the conveyor shaft in mesh with the driving shaft gear, a clutch member fixed to the conveyor shaft, a coupling gear connecting the clutch member and loose gear, a manually operated shaft in line with the conveyor shaft, planetary gearing operatively connecting the manually operated shaft to the coupling gear and a manually disengageable clutch interposed between said coupling shaft and planetary gearing.

41. In combination, a plurality of mechanisms for operating on box blanks, a plurality of endless conveyors for the box blanks, means for driving the conveyors and mechanisms in predetermined angular relation to one another, and means for adjusting the relation to determine the operative position of a box blank in the mechanisms.

42. A creaser-roll mechanism for operating on box blanks comprising a creaser roll provided with dies, a conveyor, and driving means, in combination with means for adjusting the dies relative to the roll, and means operable while the mechanisms are in operation for adjusting the roll relative to the driving means, whereby the position of the creases formed in a box blank may be determined.

43. A creaser-roll mechanism for operating on box blanks comprising a creaser roll provided with dies, a conveyor, and driving means, in combination with means for adjusting the roll relative to the driving means, whereby the position of the creases formed in a box blank may be determined, said roll-adjusting being operable while the mechanism is in operation.

In testimony whereof, I have hereunto set my hand.

LELAND S. ROSENER.